United States Patent
Camp et al.

(10) Patent No.: US 10,650,670 B2
(45) Date of Patent: May 12, 2020

(54) METHOD AND APPARATUS FOR PUBLISHING ROAD EVENT MESSAGES

(71) Applicant: HERE GLOBAL B.V., Eindhoven (NL)

(72) Inventors: Robert Camp, Winfield, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/815,288

(22) Filed: Nov. 16, 2017

(65) Prior Publication Data

US 2019/0147736 A1    May 16, 2019

(51) Int. Cl.
*G08G 1/01* (2006.01)
*B60W 40/06* (2012.01)
(Continued)

(52) U.S. Cl.
CPC .......... *G08G 1/0112* (2013.01); *B60W 40/06* (2013.01); *G08G 1/0133* (2013.01); *G08G 1/0141* (2013.01); *G08G 1/096708* (2013.01); *G08G 1/096741* (2013.01); *B60W 2552/00* (2020.02); *B60W 2555/20* (2020.02); *G05D 1/0088* (2013.01); *G05D 1/0287* (2013.01);
(Continued)

(58) Field of Classification Search
CPC .... G08G 1/0112; G08G 1/161; G08G 1/0129; G08G 1/0133; G08G 1/0141; G08G 1/096741; G05D 1/0088; G05D 1/0287
See application file for complete search history.

(56) References Cited

U.S. PATENT DOCUMENTS 6,266,603 B1 * 7/2001 Taffin ................... B60W 40/064
                                                           180/197
2010/0250106 A1    9/2010 Bai et al.
(Continued)

FOREIGN PATENT DOCUMENTS

DE    102005057251 A1    6/2007
WO    2014/032682 A1     3/2014
(Continued)

OTHER PUBLICATIONS

Office Action for related European Patent Application No. 18206610.0-1203, dated Apr. 12, 2019, 11 pages.
(Continued)

*Primary Examiner* — Benyam Haile
(74) *Attorney, Agent, or Firm* — Ditthavong & Steiner, P.C.

(57) ABSTRACT

An approach is provided for publishing a road event message according to a hysteresis. For example, the approach involves processing a road report to determine a road event associated with a geographic location and a confidence metric of the road event. The approach also involves initiating a publishing of a road event message to indicate the road event for the geographic location based on determining that the confidence metric is greater than an upper threshold of a hysteresis. The approach further involves processing one or more other road reports to update the confidence metric of the road event. The approach further involves initiating a cancelling of the road event message based on determining that the updated confidence metric is less than a lower threshold of the hysteresis.

19 Claims, 15 Drawing Sheets

(51) Int. Cl.
  *G08G 1/0967*  (2006.01)
  *G08G 1/16*    (2006.01)
  *G05D 1/00*    (2006.01)
  *G05D 1/02*    (2020.01)

(52) U.S. Cl.
  CPC ......... *G08G 1/0129* (2013.01); *G08G 1/0145* (2013.01); *G08G 1/161* (2013.01)

(56) References Cited

U.S. PATENT DOCUMENTS

| | | | |
|---|---|---|---|
| 2013/0177202 A1* | 7/2013 | Dierks | B60Q 1/143 |
| | | | 382/103 |
| 2015/0254986 A1* | 9/2015 | Fairfield | G08G 1/22 |
| | | | 707/687 |
| 2017/0132929 A1 | 5/2017 | Mays et al. | |
| 2017/0268896 A1* | 9/2017 | Bai | G01C 21/36 |

FOREIGN PATENT DOCUMENTS

| | | | | |
|---|---|---|---|---|
| WO | 2017009464 A1 | 1/2017 | | |
| WO | WO-2017009464 A1 * | 1/2017 | ............ | G01C 21/32 |
| WO | 2017053357 A1 | 3/2017 | | |

OTHER PUBLICATIONS

Staron et al., "Data Veracity in Intelligent Transportation Systems: The Slippery Road Warning Scenario", 2016 IEEE Intelligent Vehicles Symposium, Jun. 2016, 6 pages.

Office Action for related European Patent Application No. 18206610.0-1203, dated Jul. 16, 2019, 10 pages.

* cited by examiner

METHOD AND APPARATUS FOR PUBLISHING ROAD EVENT MESSAGES

BACKGROUND

Modern vehicles are increasingly capable of sensing and reporting a large variety of road-related events (e.g., slippery road events, traffic incidents, weather events, etc.) as they travel throughout a road network. Traffic service providers (TSPs) can use these reports to publish real-time traffic reports to customers and/or other users. However, because of the potential high volume of road reports that can be received in real-time, TSPs and other similar map data providers face significant technical challenges to creating, updating, canceling, and/or publishing road event messages based on the received road event reports without overtaxing available computing resources and/or bandwidth resources available to publish or transmit the resulting road event messages.

SOME EXAMPLE EMBODIMENTS

Therefore, there is need for an approach for selectively publishing road event messages to make efficient use of available computing and/or bandwidth resources.

According to one embodiment, a computer-implemented method for publishing a road event message comprises processing a road report to determine a road event associated with a geographic location (e.g., a road link) and a confidence metric of the road event. The method also comprises initiating a publishing of a road event message to indicate the road event for the geographic location based on determining that the confidence metric is greater than an upper threshold of a hysteresis. In some embodiments, the upper threshold criterion can be used in combination with other factors (e.g., whether a road event has been previously published, whether a geometry of the road event has changed, etc.) to determine when to initiate the publishing of the road event message. The method further comprises processing one or more other road reports to update the confidence metric of the road event. The method further comprises initiating a cancelling of the road event message based on determining that the updated confidence metric is less than a lower threshold of the hysteresis. In one embodiment, the method further comprises suppressing a publishing of another road event message based on determining that the updated confidence metric remains above the lower threshold of the hysteresis. In yet another embodiment, the suppressing of the publishing of another road event message is based on determining that the updated confidence metric remains both above the lower threshold of the hysteresis and below the upper threshold of the hysteresis.

According to another embodiment, an apparatus for publishing a road event message comprises at least one processor, and at least one memory including computer program code for one or more programs, the at least one memory and the computer program code configured to, with the at least one processor, to cause, at least in part, the apparatus to process a road report to determine a road event associated with a geographic location and a confidence metric of the road event. The apparatus is also caused to initiate a publishing of a road event message to indicate the road event for the geographic location based on determining that the confidence metric is greater than an upper threshold of a hysteresis. In some embodiments, the upper threshold criterion can be used in combination with other factors (e.g., whether a road event has been previously published, whether a geometry of the road event has changed, etc.) to determine when to initiate the publishing of the road event message. The apparatus is further caused to process one or more other road reports to update the confidence metric of the road event. The apparatus is further caused to initiate a cancelling of the road event message based on determining that the updated confidence metric is less than a lower threshold of the hysteresis. In one embodiment, the apparatus is further caused to suppress a publishing of another road event message based on determining that the updated confidence metric remains above the lower threshold of the hysteresis. In yet another embodiment, the suppressing of the publishing of another road event message is based on determining that the updated confidence metric remains both above the lower threshold of the hysteresis and below the upper threshold of the hysteresis.

According to another embodiment, a computer-readable storage medium for publishing a road event message, carrying one or more sequences of one or more instructions which, when executed by one or more processors, cause, at least in part, an apparatus to process a road report to determine a road event associated with a geographic location and a confidence metric of the road event. The apparatus is also caused to initiate a publishing of a road event message to indicate the road event for the geographic location based on determining that the confidence metric is greater than an upper threshold of a hysteresis. In some embodiments, the upper threshold criterion can be used in combination with other factors (e.g., whether a road event has been previously published, whether a geometry of the road event has changed, etc.) to determine when to initiate the publishing of the road event message. The apparatus is further caused to process one or more other road reports to update the confidence metric of the road event. The apparatus is further caused to initiate a cancelling of the road event message based on determining that the updated confidence metric is less than a lower threshold of the hysteresis. In one embodiment, the apparatus is further caused to suppress a publishing of another road event message based on determining that the updated confidence metric remains above the lower threshold of the hysteresis. In yet another embodiment, the suppressing of the publishing of another road event message is based on determining that the updated confidence metric remains both above the lower threshold of the hysteresis and below the upper threshold of the hysteresis.

According to another embodiment, an apparatus for publishing a road event message comprises means for publishing a road event message comprises processing a road report to determine a road event associated with a geographic location and a confidence metric of the road event. The apparatus also comprises means for initiating a publishing of a road event message to indicate the road event for the geographic location based on determining that the confidence metric is greater than an upper threshold of a hysteresis. In some embodiments, the upper threshold criterion can be used in combination with other factors (e.g., whether a road event has been previously published, whether a geometry of the road event has changed, etc.) to determine when to initiate the publishing of the road event message. The apparatus further comprises means for processing one or more other road reports to update the confidence metric of the road event. The apparatus further comprises means for initiating a cancelling of the road event message based on determining that the updated confidence metric is less than a lower threshold of the hysteresis. In one embodiment, the apparatus further comprises means for suppressing a publishing of another road event message based on determining that the updated confidence metric remains above the lower threshold of the hysteresis. In yet another embodiment, the suppressing of the publishing of another road event message is based on determining that the updated confidence metric remains both above the lower threshold of the hysteresis and below the upper threshold of the hysteresis.

According to another embodiment, a computer-implemented method for publishing a road event message comprises monitoring a confidence metric for a road event detected on a geographic location. The method also comprises publishing a road event message indicating the road event when the confidence metric is greater than an upper threshold of a hysteresis. The method further comprises canceling the road event message when the confidence metric is less than a lower threshold of a hysteresis. In one embodiment, the method further comprises operating an autonomous vehicle or a semi-autonomous vehicle, or presenting a user interface element depicting a visual representation of the road event in a mapping user interface of a device based on the road event message.

According to another embodiment, an apparatus for publishing a road event message comprises at least one processor, and at least one memory including computer program code for one or more programs, the at least one memory and the computer program code configured to, with the at least one processor, to cause, at least in part, the apparatus to monitor a confidence metric for a road event detected on a geographic location. The apparatus is also caused to publish a road event message indicating the road event when the confidence metric is greater than an upper threshold of a hysteresis. The apparatus is further caused to cancel the road event message when the confidence metric is less than a lower threshold of a hysteresis. In one embodiment, the apparatus is further caused to transmit a signal to operate an autonomous vehicle or a semi-autonomous vehicle, or present a user interface element depicting a visual representation of the road event in a mapping user interface of a device based on the road event message.

According to another embodiment, a computer-readable storage medium for publishing a road event message carrying one or more sequences of one or more instructions which, when executed by one or more processors, cause, at least in part, an apparatus to monitor a confidence metric for a road event detected on a geographic location. The apparatus is also caused to publish a road event message indicating the road event when the confidence metric is greater than an upper threshold of a hysteresis. The apparatus is further caused to cancel the road event message when the confidence metric is less than a lower threshold of a hysteresis. In one embodiment, the apparatus is further caused to transmit a signal to operate an autonomous vehicle or a semi-autonomous vehicle, or present a user interface element depicting a visual representation of the road event in a mapping user interface of a device based on the road event message.

According to another embodiment, an apparatus for publishing a road event message comprises means for monitoring a confidence metric for a road event detected on a geographic location. The apparatus also comprises means for publishing a road event message indicating the road event when the confidence metric is greater than an upper threshold of a hysteresis. The apparatus further comprises means for canceling the road event message when the confidence metric is less than a lower threshold of a hysteresis. In one embodiment, the apparatus further comprises means for operating an autonomous vehicle or a semi-autonomous vehicle, or means for presenting a user interface element depicting a visual representation of the road event in a mapping user interface of a device based on the road event message.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for publishing a road event message are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
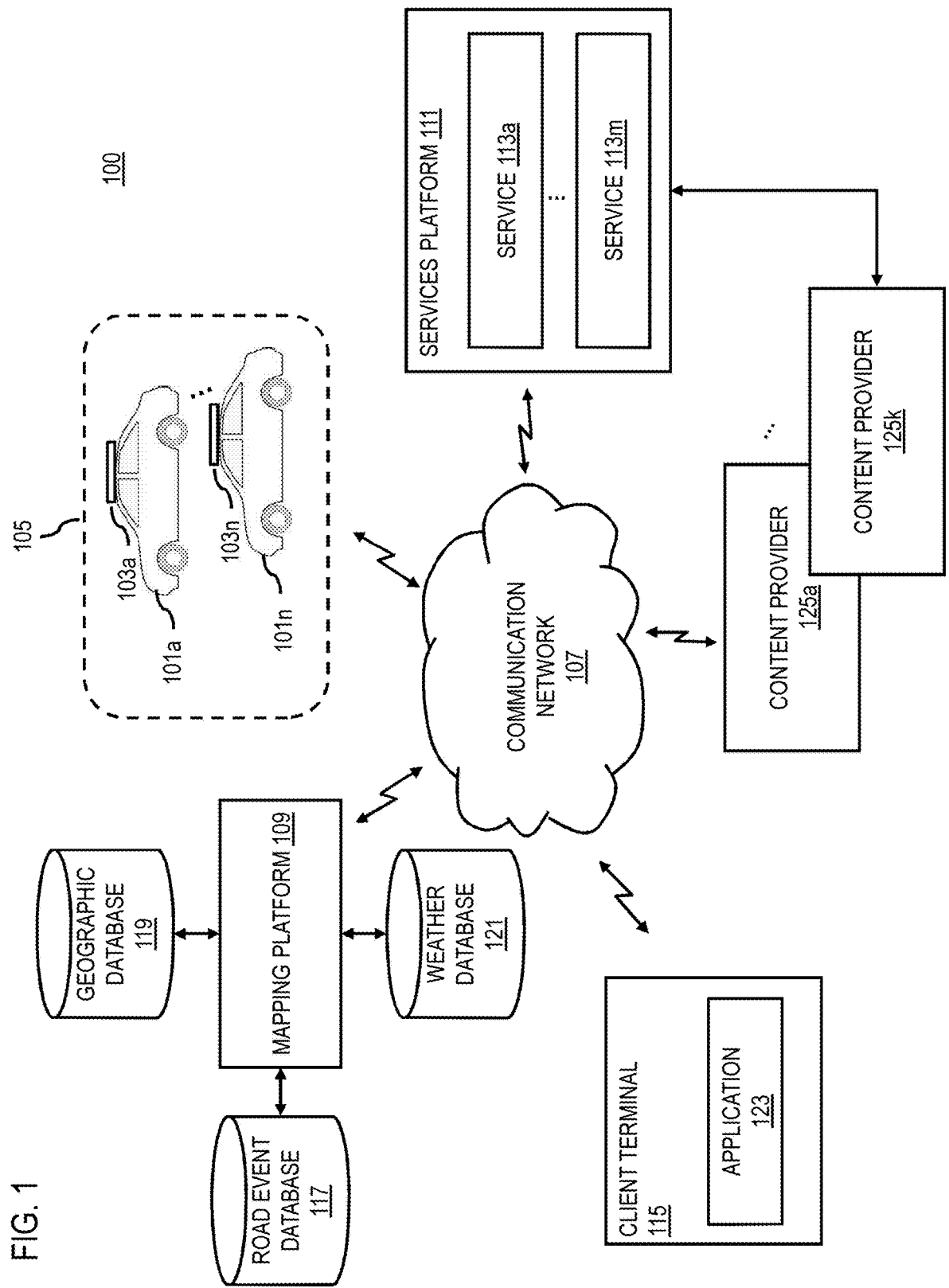
FIG. 1 is a diagram of a system capable of publishing a road event message, according to one embodiment.

FIG. 1 is a diagram of a system capable of publishing a road event message, according to one embodiment. Service providers (e.g., traffic service providers (TSPs), map data providers, navigation service providers, etc.) and vehicle manufacturers are increasingly developing compelling navigation and other location-based services that improve the overall driving experience for end users. One example of such a service is a real-time traffic information system that can publish messages reporting road events (e.g., slippery road events, traffic incidents, construction events, weather events, etc.) that are reported by connected vehicles or sensors operating in a road network. For example, connected vehicles can use their respective sensors to detect slippery road conditions (e.g., loss of adhesion between the vehicle and the road on which it is traveling), which in turn can be used for issuing a local hazard warning (e.g., a road event message), updating real-time mapping data, as inputs in to a mapping data pipeline process, and/or any other purpose.

As shown FIG. 1, the system 100 comprises one or more vehicles 101a-101n (also collectively referred to as vehicles 101) respectively equipped with sensors 103a-103n (also collectively referred to as sensors 103) for sensing vehicle telemetry data (e.g., speed, heading, acceleration, lateral acceleration, braking force, wheel speed, etc.), road conditions, environmental conditions (e.g., weather, lighting, etc.), and/or other characteristics (e.g., slippery road conditions) of an area of interest 105 of a transportation network (e.g., a road network) in which the vehicles 101 are traveling. The vehicles 101 (e.g., "connected vehicles") are also equipped with communications capability (e.g., a wireless communications device configured to transmit road reports (e.g., slippery road reports) and/or associated sensor data for detecting a road event over a communication network 107 to a mapping platform 109 and/or the services platform 111 (and/or any of the services 113a-113m of the services platform 111, also collectively referred to as services 113). In one embodiment, in addition to or instead of embedded communications capabilities, the vehicles 101 can be associated or configured with a communications device such as a client terminal 115 or other equivalent system to report detected road events (e.g., slippery road events).

In one embodiment, slippery road reports and/or reports of other road events provided by the vehicles 101 are collected, processed, and stored by the mapping platform 109 as map data in the road event database 117 and/or geographic database 119. Accordingly, in one embodiment, the map data provided to other vehicles 101 traveling the road network can include incident reports (e.g., slippery road reports) indicating road events related to the road segment or link being travelled. For example, the mapping platform 109 can publish (e.g., transmit over the communication network 107) a road event message to indicate that there has been a road event or condition reported for a particular geographic location (e.g., a message indicating that a road segment is slippery and therefore potentially dangerous to drive). With respect slippery road events as an example, the slippery conditions of a road are typically due to low friction of the road surface. These low friction road conditions, for instance, may depend on many factors such as weather, temperature, humidity, road surface type, road surface quality, etc. Generally, the level of adhesion between the road surface and the vehicle 101 (e.g., tires of the vehicle 101) is used to estimate or detect these low friction conditions.

Historically, service providers (e.g., via the mapping platform 109, the services platform 111, and/or services 113) have aggregated road event reports (e.g., each report comprising sensor data in addition to a location and time the data was sensed by the vehicle 101) for further processing and action. For example, the service providers can aggregate the reports from the vehicles 101 to generate and transmit road event messages to alert end users of any detected road event (e.g., a slippery road event) as a local hazard warning. This aggregation and processing generally occurs in near real-time in predetermined time epochs (e.g., 15-30 minute time epochs). In other words, the road event reports (e.g., sensor data reports) received from connected vehicles 101 are aggregated into bins according to a distance threshold and a time window (e.g., the time epoch). For example, if reports indicating a road event are received within the current time epoch under evaluation, then the mapping platform 109 or a service provider using the mapping platform 109 can transmit a message indicating the road event (e.g., over a Radio Data System-Traffic Message Channel (RDS-TMC) or equivalent system).

However, as the number connected vehicles 101 grows, the number of road event reports received from the connected vehicles 101 also grow, thereby leading to a corresponding increase in the number of road event messages that may be published by the mapping platform 109. In many cases, because different vehicles 101 traveling along the same route can potentially submit road reports about the same event, the mapping platform 109 may also report a single detected road event in different duplicate road event messages. These duplicate road event messages can result in wasted computing and/or bandwidth resources, as well as a poor user experience. Duplicate road event messages can occur, for instance, when no spatial or temporal binning is performed, the spatial/temporal binning is performed in a decentralized manner (e.g., by different nodes to mapping platform 109 when load balancing), and/or the like.

In one embodiment, road event reports are typically generated based on information provided by multiple vehicles 101 under different driving conditions (e.g., different driving behaviors, speeds, etc.) and different environmental conditions (e.g., weather conditions). Accordingly, the mapping platform 109 can compute a confidence level or score to indicate how likely it is that a reported/detected road event is actually occurring on a particular geographic location based on the different observed characteristics of the road event reports received from the vehicles 101 or other sensors operating in the area of interest 105 (e.g., a geographic location, road link, etc.) of a road network. In some cases, service providers can apply a threshold value on the confidence factor to determine whether a detected road event should be published as a road event message to end users. However, when the confidence hovers near this threshold for a reported event, applying such a threshold can lead to repeated cycles of publishing and canceling road event messages. For example, in one embodiment, canceling a road event message comprises publishing another message to delete a previous message indicating that the road event message. Therefore, in the various embodiment described herein, the term canceling can be used interchangeably with deleting a road event message. These cycles of messages can also lead to increased message volume similar the problem of duplicate messages described above.

For example, with respect to slippery road events, reported adhesion events can potentially include factors related to driving behavior instead of true slippery conditions. In other words, there can be the potential to generate false positive slippery road reports when driving behavior is the dominant factor in detecting a loss of adhesion between the vehicle 101 and the road way. When driving behavior is a dominant or significant factor in a slippery road report received from a vehicle 101, the mapping platform can compute the confidence level of slippery road event on the reported link to be lower because the detected loss of adhesion of the reporting vehicle 101 (e.g., sensed wheel spin, sensed acceleration or deceleration behind a threshold value, etc.) can be attributable to the way a driver is operating the vehicle 101 as opposed to an actual low friction condition of the roadway.

In many cases, publishing a high number of unnecessary road event messages can lead to reduced map data reliability and potentially wasted resources. Examples of wasted resources include, but are not limited to, computational resources of the mapping platform 109 to process the unnecessary road event messages (e.g., duplicate or redundant messages); and/or resources of the vehicles 101 used to respond to unnecessary or duplicate road event messages such as by unnecessarily recalculating navigation routes, initiating alternative autonomous operations (e.g., when the vehicle 101 is an autonomous or semi-autonomous vehicle). In other words, the quality of the map data including the published road event messages relied upon by location-based and/or navigation services directly impacts the ability of the vehicles 101 (particularly an autonomous or semi-autonomous vehicle) to operate effectively. For example, the vehicles 101 typically employ onboard navigations systems for interacting with a global positioning service, mapping service or the like to receive relevant location information, slippery road reports, reports of other road events (e.g., precipitation, visibility, speed, etc.), driving instructions, traffic information and other data for supporting autonomous operation or navigation of the vehicle 101. Based on the published road event messages, the vehicle 101 may execute various actions (e.g., change operation mode from autonomous to manual or vice versa, initiate a turn, accelerate, brake, etc.) relative to the travel path upon which it is navigating. If the received road events are duplicative or otherwise unnecessary, these actions may be taken unnecessarily thereby unnecessarily expending vehicle resources.

To address these problems, the system 100 of FIG. 1 introduces a capability to publish, create, update, and/or cancel road event messages based on applying a hysteresis to the confidence levels computed for a reported road event. In one embodiment, the road event messages published based on the hysteresis can then be used for determining autonomous or semi-autonomous functions of a vehicle 101, present the road event message in a mapping user interface of a device (e.g., client terminal 115), and/or facilitate any other function of a real-time traffic/map data pipeline. In one embodiment, the hysteresis includes an upper threshold confidence level above which the system will consider a road event as detected and publishable, and a lower threshold confidence level below which the road event is considered no longer detected. By using a hysteresis, the system 100 advantageously builds in a "lag" in determining when a published road event should be canceled, updated, etc. after the road event has been detected, published, etc. For example, when a report reaches a confidence level greater than the upper threshold of the hysteresis, the system 100 creates or publishes a road event message to indicate that a road event has been detected on the corresponding geographic location. The system 100 then continues to monitor incoming road reports to update the confidence level or score for the detected road event. In one embodiment, no other messages concerning the road event are published until the monitored confidence level of the road event falls below the lower threshold of the hysteresis. In this way, the system 100 is not susceptible to multiple messages that would be created when the confidence level oscillates around a single threshold value. In addition, multiple duplicate messages that are generated within the life time of the published road event message would also be suppressed from publication as long as the confidence level remains above the lower threshold of the hysteresis and/or the published road event message has not expired (e.g., in embodiments where a message expiration parameter is used). In some embodiment, messages about the published road event message are suppressed when the confidence level remains both above the lower threshold and below the upper threshold. In this way, the system 100 can republish road event messages to renew the life time of the published road event when the confidence level crosses back over the upper threshold.

In one embodiment, the system 100 can apply the approach described herein whenever a new road event report (e.g., new sensor data) is reported by one or more connected vehicles 101, or an existing road event report or message expires (e.g., based on a predetermined time-to-live or other expiration criteria). These road event reports (e.g., slippery road event reports) from the connected vehicles 101 are aggregated and analyzed to compute the confidence level or score for a corresponding road event. The system 100 then generates or publishes a road event message based on the received road reports if conditions of the hysteresis with to the computed confidence levels are met. For example, in one embodiment, the system 100 (e.g., via the mapping platform 109 operated by a TSP) can publish road event messages (e.g., slippery road event messages) to automobile Original Equipment Manufacturers (OEM) (e.g., operating a third-party services platform 111) so that the OEM can warn or otherwise relay the road event message to its fleet of vehicles 101 to warn the vehicles of potential road events in the area of interest 105 of the road network.

Figure 2:
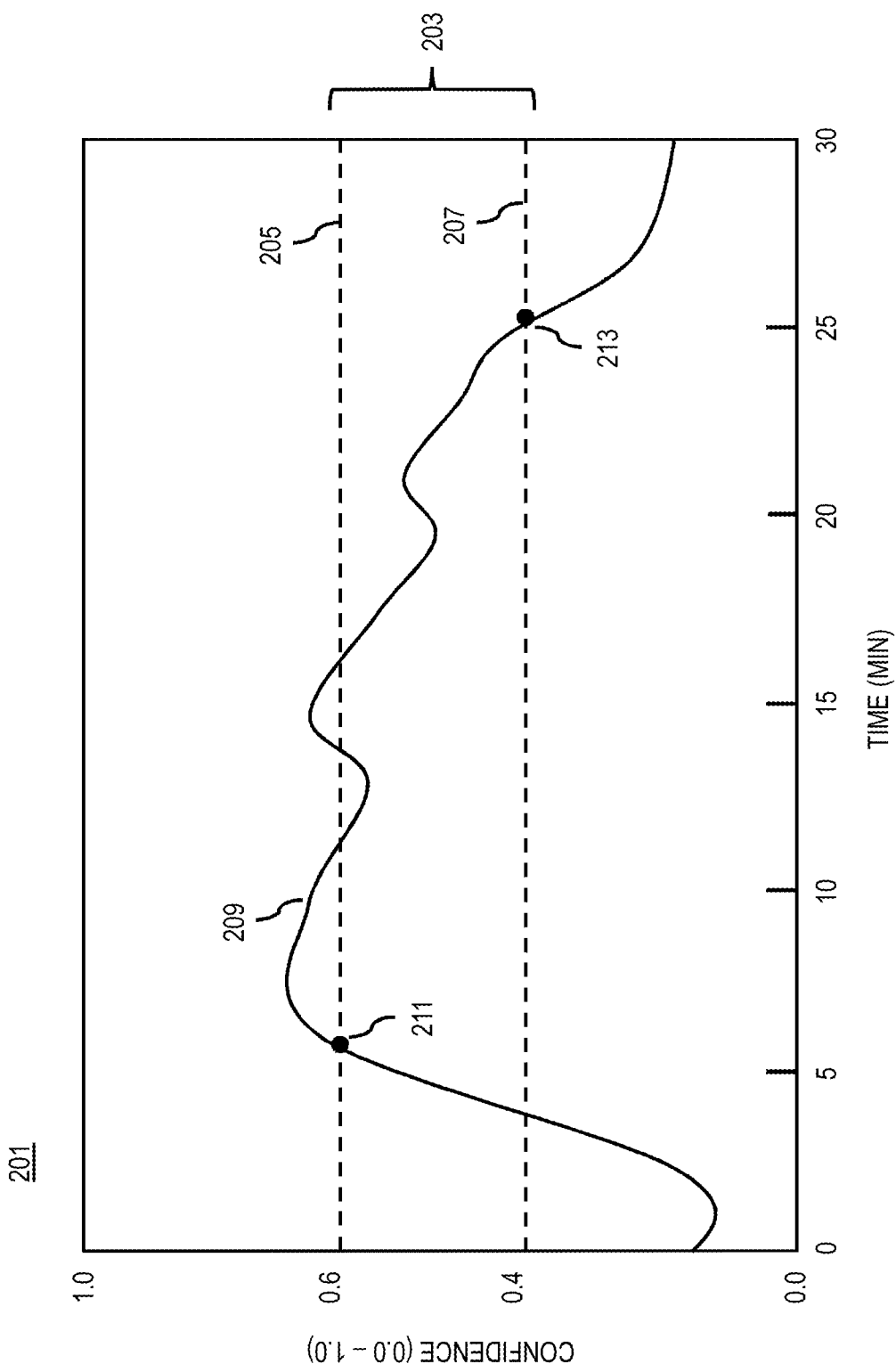
FIG. 2 is a diagram illustrating an example of using a hysteresis to determine when to create, update, cancel, and/or publish a road event message, according to one embodiment.

FIG. 2 is a diagram illustrating an example to determine when to create, update, cancel, and/or publish a road event message based on a hysteresis, according to one embodiment. It is noted that when the various embodiments described herein refer to "publishing" a road event message, it is intended that any other function that can be performed on a road event message (e.g., creating, updating, canceling, etc.) can be used synonymously in the description. In addition, any reference to a slippery road event is provided as an example of a road event; therefore, any description provided herein with respect to slippery road events can be generalized to all road events. As shown in FIG. 2, a graph 201 depicts the confidence level computed from road event reports collected from connected vehicles 101 for a detected road event/condition over time for a given road segment or link of interest. In one embodiment, the system 100 can use any means known in the art to compute a confidence level from the received road event reports (e.g., based on factors such as number of reporting vehicles 101, freshness of the reports, correlation to weather or other contextual data, etc.).

In one embodiment, creation or publishing of a road event message (e.g., slippery road event message) is based on a considering a hysteresis 203 on the computed confidence. In this example, the confidence levels are normalized to a range from 0 to 1. Accordingly, the upper confidence bar or threshold 205 of the hysteresis 203 is set at 0.6, and the lower confidence bar or threshold 207 of the hysteresis 203 is set at 0.4. It is noted that the values of the thresholds 205 and 207 of the hysteresis 203 are provided as illustrations and not as limitations. Using the hysteresis 203, the system 100 creates or publishes a road event message indicating that a road event has been detected on a geographic location when the computed confidence of that detection surpasses the upper hysteresis bar 205.

As shown in graph 201, the confidence level line 209 surpasses the upper hysteresis bar 205 at time 211 (approximately 6 minutes of the time epoch represented in the graph 201). Accordingly, at time 211, the system 100 publishes a corresponding road event message. The system 100 then continues to monitor the confidence level, and cancels the road event message (e.g., by transmitting a cancel or delete road event message) when the computed confidence drops below the lower confidence bar 207 at time 213 (at approximately 25 minutes of the time epoch). In one embodiment, road event reports whose computed confidence levels oscillate within the upper threshold 205 and the lower threshold 207 (e.g., confidence oscillations shown between 6 minutes and 25 minutes of the graph 201) do not result in anything being published by the system 100 to advantageously minimize the messages being published, and reduce associated corresponding computing and/or bandwidth resource usage. In addition, users (e.g., OEMs, services platform 111, vehicles 101, client terminals 115, etc.) also would have to receive and process fewer messages from the system 100 (e.g., a mapping platform 109 operated by a TSP or other map data provider), thereby also advantageously reducing use or waste of computing/bandwidth resources.

Figure 3:
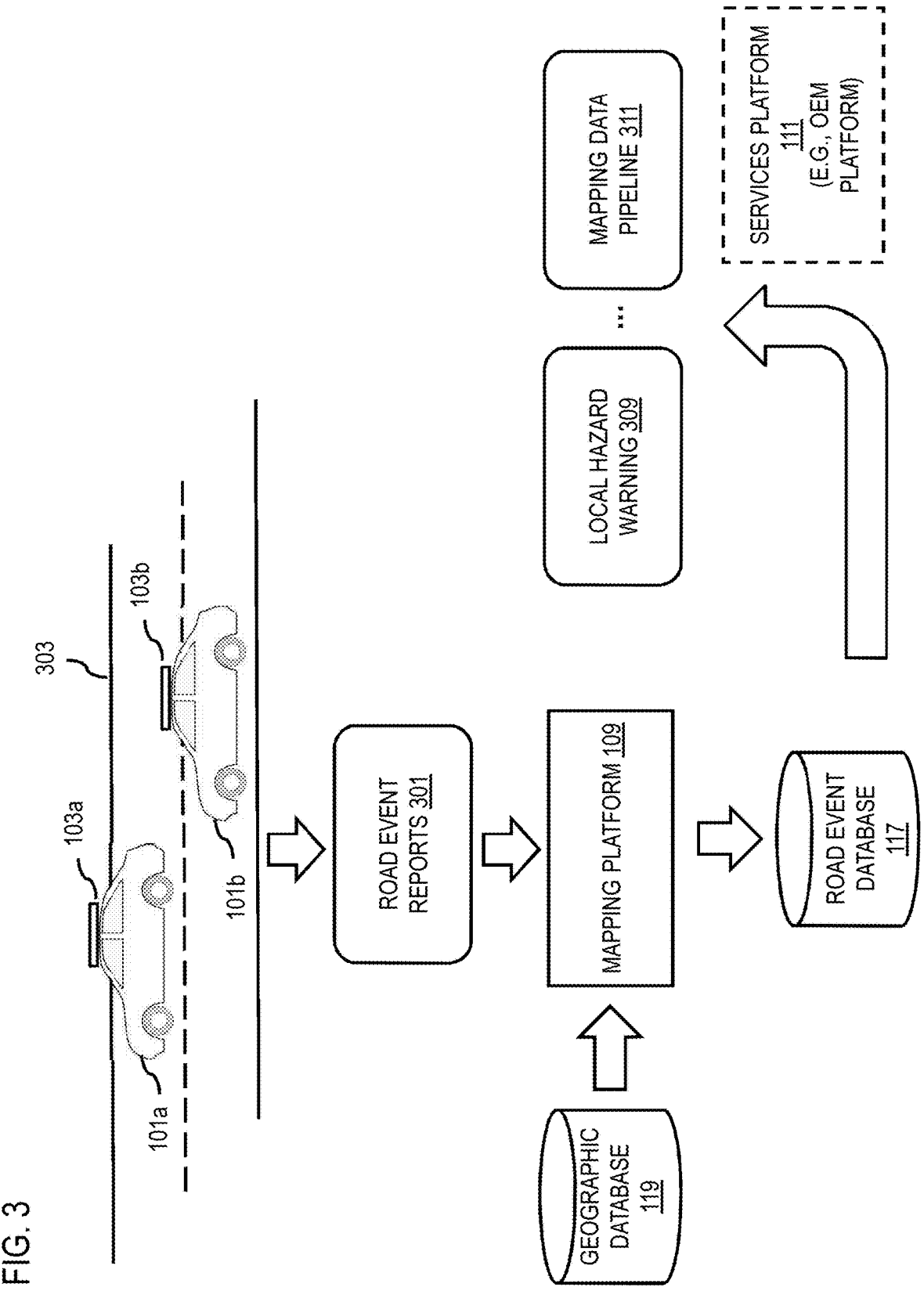
FIG. 3 is a diagram illustrating real-time data pipeline for publishing a road event message, according to one embodiment.

In one embodiment, the publishing of road event messages based on a hysteresis can be performed as part of a real-time data pipeline. FIG. 3 is a diagram illustrating an example real-time data pipeline for publishing a road event message, according to one embodiment. As shown, the mapping platform 109 receives road event reports 301 (e.g., slippery road reports) from vehicles 101 (such as the vehicle 101a equipped with sensors 103a and the vehicle 101b equipped with sensors 103b) as the vehicles 101 travel on a road network. The road event reports 301 are tagged with locations where the respective road events or conditions were sensed (e.g., locations along the road segment 303). The mapping platform 109 aggregates and analyzes the road event reports 301 to compute a confidence for a corresponding road event. The confidence be based on a variety of factors including, but not limited to, the geometry of the road event (e.g., the extent of the road links or geographic locations of the geographic database 119 to which the road event reports 301 are map matched). As described above, the mapping platform 109 applies a hysteresis on the computed confidence to determine to publish, create, update, cancel, etc. a road event message for storage in the road event database 117. In one embodiment, the mapping platform 109 can query the geographic database 119 for an applicable hysteresis (e.g., a hysteresis corresponding to the geographic location of interest, a road event of interest, etc.).

In one embodiment, the road event messages stored in the road event database 117 can then be published to end users, for instance, to support a local hazard warning 309, autonomous/semi-autonomous vehicle operation, and/or other functions of a mapping data pipeline 311 such as a pipeline for real-time map data updates and/or related services). In one embodiment, the mapping platform 109 can use any architecture for transmitting the road event messages and/or related update, cancel, etc. messages to the end user devices (e.g., the vehicle 101, client terminal 115, etc.). For example, the mapping platform 109 can transmit or publish the road event messages directly to the end user devices or optionally via a third-party services platform 111. When performing direct publishing, the transmission of the road even message is performed over the communication network 107 between the mapping platform 109 and one or more user devices (e.g., the vehicles 101, client terminal 115, etc.) directly. When publishing via a third-party, the transmission of the road event message is performed over the communication network 107 between the mapping platform 109 and a third-party provider such as a OEM platform or other third party service. By way of example, the OEM platform or other third party platform can include the services platform 111 of FIG. 1. On receiving the road event message from the mapping platform 109, the third party provider (e.g., the services platform 111 and/or any of the services 113a-113j of the platform 111, also collectively referred to as services 113) further processes and/or transmits the road event to one or more user devices (e.g., the vehicles 101, client terminal 115, etc.).

Figure 4:
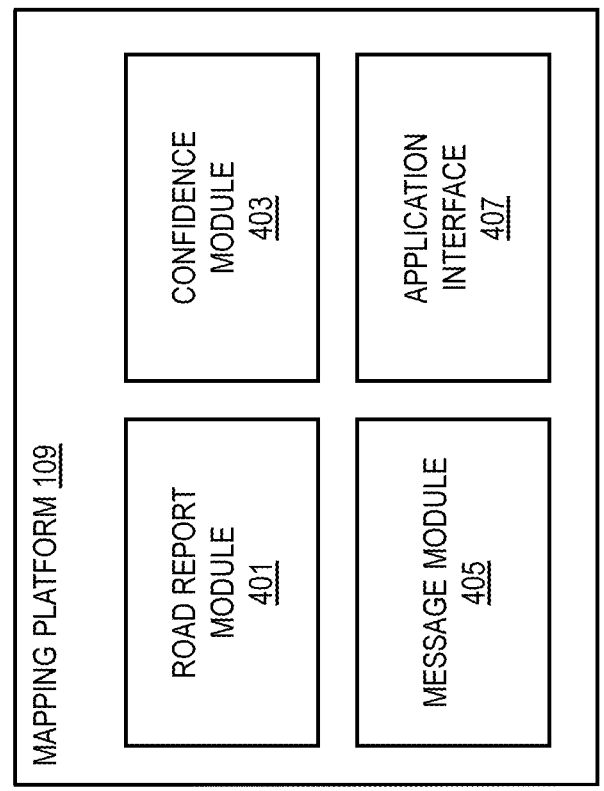
FIG. 4 is a diagram of the components of a mapping platform capable of publishing a road event message, according to one embodiment.

FIG. 4 is a diagram of the components of a mapping platform capable of publishing a road event message using a hysteresis, according to one embodiment. By way of example, the mapping platform 109 includes one or more components for publishing a road event message according to the various embodiments described herein. It is contemplated that the functions of these components may be combined or performed by other components of equivalent functionality. In this embodiment, the mapping platform 109 includes a road report module 401, a confidence module 403, a message module 405, and an application interface 407. The above presented modules and components of the mapping platform 109 can be implemented in hardware, firmware, software, or a combination thereof. Though depicted as a separate entity in FIG. 1, it is contemplated that the mapping platform 109 may be implemented as a module of any of the components of the system 100 (e.g., a component of the vehicle 101, services platform 111, services 113, client terminal 115, etc.). In another embodiment, one or more of the modules 401-407 may be implemented as a cloud based service, local service, native application, or combination thereof. The functions of the mapping platform 109 and the modules 401-407 are discussed with respect to FIGS. 5-8B below.

Figure 5:
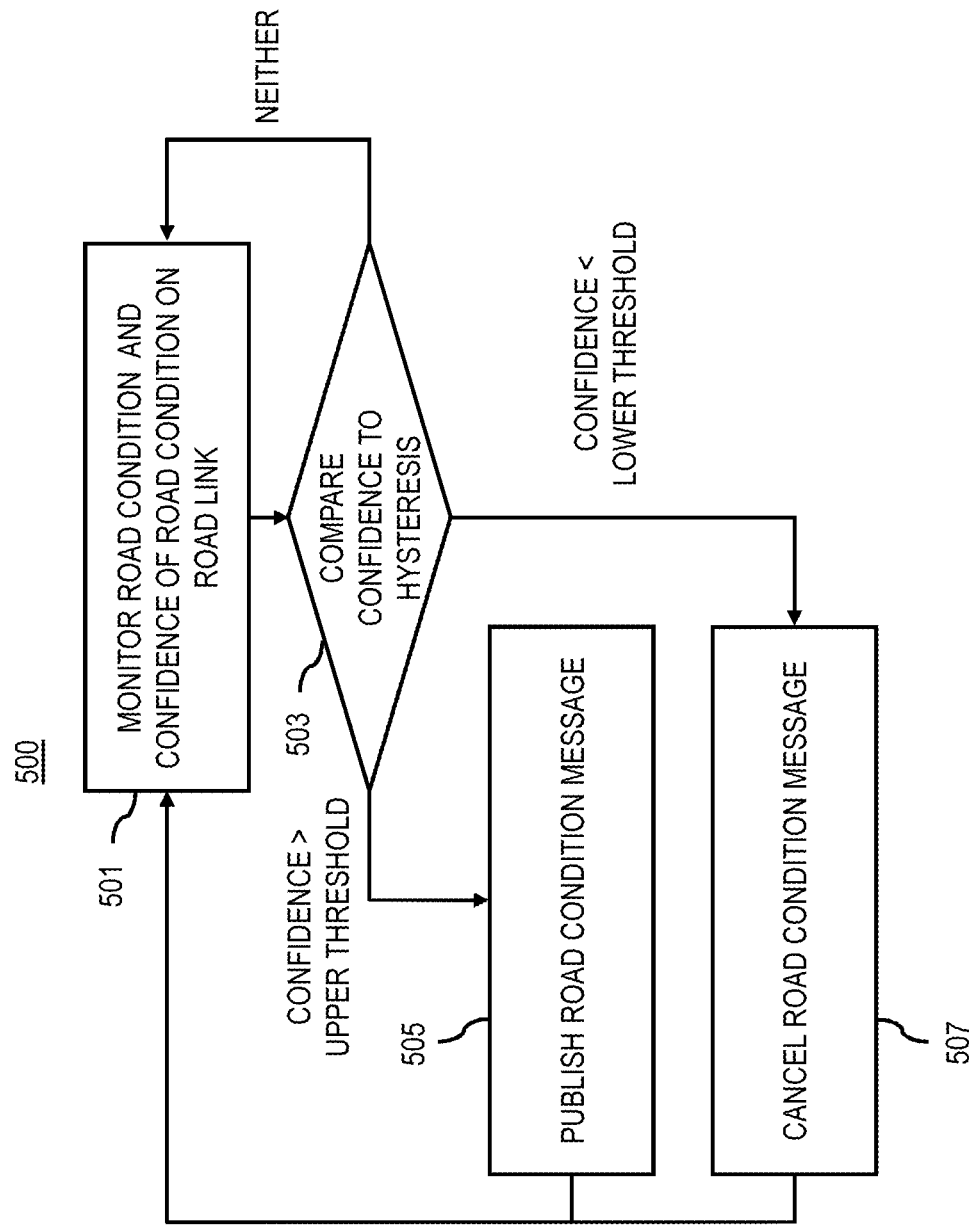
FIG. 5 is a flowchart of a process for publishing a road event message, according to one embodiment.
Figure 11:
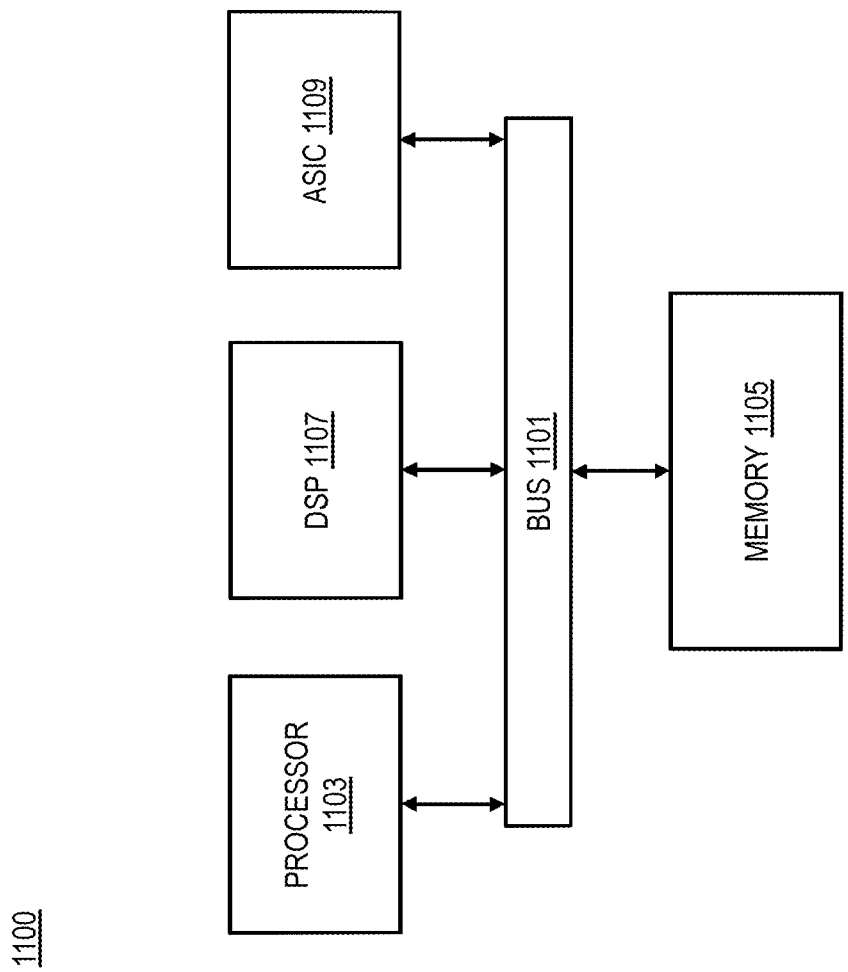
FIG. 11 is a diagram of a chip set that can be used to implement the system and/or functions thereof, according to one embodiment.

FIG. 5 is a flowchart of a process for publishing a road event message, according to one embodiment. In various embodiments, the mapping platform 109 and/or any of the modules 401-407 of the mapping platform 109 as shown in FIG. 4 may perform one or more portions of the process 500 and may be implemented in, for instance, a chip set including a processor and a memory as shown in FIG. 11. As such, the mapping platform 109 and/or the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In step 501, the road report module 401 monitors road conditions at a geographic location (e.g., along a road segment or link of interest). As previously described, in one embodiment, the monitoring occurs to determine when new road event reports are received from connected vehicles 101 and/or when previously received road event reports or previously published/created road event messages expire. By way of example, road event reports are the sensor data reports received from the connected vehicles, and the road event messages are the published or created messages that result from processing the road event reports to determine whether the mapping platform 109 should create or publish a message to indicate that a road event or condition (e.g., slippery road event) is detected from the collected road event reports.

In one embodiment, the road report module 401 processes a road report to determine a road event associated with a geographic location and a confidence metric of the road event. In one embodiment, the geographic location can be specified as a road link or node of the geographic database 119. It is contemplated that with respect to the embodiments described herein the term geographic location can be used interchangeably with road link, node, and/or any other term to specify a map location or area. The confidence module 403 interacts with the road report module 401 to compute confidence levels for a road event detected from the road event reports collected by the road report module 401. It is contemplated that the confidence module 403 can use any process known in the art to compute a confidence level indicating for a road event detected or predicted from a given set of road event reports.

In one embodiment, the confidence metric is based, at least in part, on a number of vehicles reporting the road event, a correlation of the road event to weather data, or a combination thereof. For example, if a single vehicle generates a report indicating a road event (e.g., a slippery road event), the confidence module 403 can assign a lower confidence level or score based on the fact that only one vehicle 101 has submitted a report about the potential road event. In one embodiment, the confidence score for a road event with only one reporting vehicle 101 can be defined so that the confidence does not reach the upper confidence threshold to trigger publishing of a corresponding road event message absent some other factor (e.g., concurrent weather conditions indicate that the road conditions are wet or icy conditions). In other words, in one embodiment, the confidence score for a single reporting vehicle on a dry or damp day will not result in meeting the hysteresis threshold for publishing a road event message.

However, if two or more vehicles 101 (e.g., the number of vehicles is configurable by an administrator or user of the mapping platform 109) generate road event reports about the same road event (e.g., a slippery road event) within spatial and/or temporal constraints, the resulting computing confidence can be weighted to result in reaching the upper threshold of the hysteresis for publishing a road event message regardless of the detected weather-related road conditions (e.g., dry day, or wet/icy day).

In one embodiment, the confidence module 403 can further compute a confidence level based on the freshness or recentness of collected road event reports. For example, if road events detected from road event reports that are less than 15-minutes (or some other freshness threshold time) can be scored to increase the confidence of a road report. Similarly, the confidence module 403 can compute a corresponding decrease in the resulting confidence level for the detected road event based on the staleness of the road reports (e.g., generated more than they freshness threshold time ago).

In one embodiment, the relative weights or effect of the any of the confidence factors (e.g., number of reporting vehicles, correlation to weather events, report freshness, etc.) can vary or be specified by an administrator or user of the mapping platform 109. Examples of the interplay of these confidence factors with respect to publishing are slippery road event message are illustrated in the following scenarios. For example, a single vehicle 101 on a wet day will result in creating or publishing a message if the slippery event is less than eight minutes old. In another example, a single vehicle 101 on an icy day will result in creating or publishing a message unless the road report is older than the its data freshness threshold (e.g., a time-to-live (TTL) for the road report). It is noted that in one embodiment, both the road reports and any resulting road event message can have different TTLs. For example, an expiration time a road message that is generated by the mapping platform 109 can have a TTL of 30 minutes or any other configurable value. In one embodiment, the TTLs of the reports and messages can also be based on the road event type. For example, a slippery road event reports and messages may have different TTLs versus traffic incident road event reports and messages.

In one embodiment, the confidence module 403 can retrieve weather data using a multi-level map tile-based system. For example, in one embodiment, the confidence module 403 can retrieve weather data based on a map tile level 13 (e.g., a tile size representing approximately 5 km×3 km) or level 12 map tile (e.g., a tile size representing approximately 10 km×6 km). Smaller tiles can provide greater accuracy but may lead to increased processing and resource overheads. In one embodiment, the tile size can be based on the weather parameter of interest. For example, air temperature typically does not change much over a few kilometers except for the presence of water bodies (e.g., lake) or mountains. Accordingly, a higher map tile level can be used. Precipitation intensity, on the other hand, can change over a few kilometers and smaller tiles will enable the system to more accurately identify the edges of a rain storm or other precipitation event. It is noted that the average thunderstorm has a 24 km (15 mi) diameter. This diameter or area is an example of the geometry of a detected road event. In other words, the geometry can represent the road segments/links, geographic area, etc. that is affected by a given road event (e.g., the size of a precipitation event, the geographic locations or road links affected by a slippery road event, etc.).

In one embodiment, the confidence module 403 can also be configured with an elapsed time before re-fetching weather data or other similar data to correlate with reported road events from vehicles 101 (e.g., re-fetching every 10 to 20 minutes). The re-fetch rate can be dependent on the data or weather parameter of interest. For example, if the confidence module 403 re-fetches weather too often (e.g., say every couple of minutes), it is likely that the weather will not change that quickly and the increased re-fetch rate will be unnecessary and add to resource overheads or burdens. On the other hand, if the confidence module 403 re-fetches the data on the order of hours, the data, particularly weather data (e.g. air temperature and intensity of precipitation), may have changed significantly and the system 100 would the miss and provide potentially less accurate results. For example, a typical thunderstorm cell can last an average 30 to 60 minutes. Thus, the confidence module 403 can set a re-fetch rate that is at least once every 30 minutes to ensure that such weather events can be accounted for.

In step 503, the message module 405 compares the computed confidence levels of the detected road event against a hysteresis. As previously discussed, in one embodiment, the hysteresis includes an upper confidence threshold for publishing a road event message and a lower confidence threshold for canceling the road event. More specifically, the lower threshold can be any confidence threshold that is lower than the upper confidence threshold. The spread between the upper threshold and the lower threshold of the hysteresis represents the lag used by the message module 405 so that a published road event message is not immediately canceled if the publishing threshold is the same as the canceling threshold and the confidence falls just slightly below the publishing threshold. As previously discussed, the hysteresis enables the message module 405 to avoid unnecessarily or prematurely canceling messages when the confidence oscillates around the publishing threshold, thereby also reducing the number of messages published the mapping platform 109. In one embodiment, the hysteresis can be further determined based on one or more characteristics of the geographic location or road link of interest, the road event, or a combination thereof. For example, the hysteresis can be different for different road event types (e.g., slippery road event versus precipitation event), different for different functional classes of a road link, different for different average speed of a road link, etc. In one embodiment, the message module 405 can query the geographic database 119 or equivalent data store for the hysteresis associated with a geographic location or road link being monitored.

As previously described, in step 505, the message module 405 initiates a publishing of a road event message to indicate the road event for the geographic location or road link based on determining that the confidence metric is greater than an upper threshold of a hysteresis. In other words, the message module 405 publishes a road event message indicating the road event when the confidence metric is greater than an upper threshold of a hysteresis. In one embodiment, the publishing of the road message can be further based on a prior publication state of the detected road event. For example, the message module 405 may initiate publication of the road event message when the confidence metric is greater than the upper threshold and when a road event message about the same detected road event has not been previously published. In step 507, the message module 405 initiates a cancelling of the road event message based on determining that the updated confidence metric is less than a lower threshold of the hysteresis. In other words, the message module 405 cancels the road event message when the confidence metric is less than a lower threshold of a hysteresis. As with the publication step 505 above, the message module 405 can also consider a prior state or action taken with respect to the published road event message. For example, the message module 405 can initiate a cancelling of the road event message when the updated confidence metric is less than the lower threshold and if the road event message has been previously published and has not been previously canceled. Other factors affecting publication and/or canceling of road event messages are discussed below with respect to FIGS. 6A-6C.

In one embodiment, the message module 405 suppresses a publishing of another road event message based on determining that the updated confidence metric remains above the lower threshold of the hysteresis. For example, in one embodiment, once a road event reaches a confidence level (e.g., above the upper threshold of the hysteresis), the message module 405 does not publish any additional messages about the road event until the confidence level falls below the lower threshold of the hysteresis to trigger a cancellation of the published road event message. As previously described, in some embodiments, the suppression of additional road event messages can be based on the confidence metric remaining both above the lower threshold and below the upper threshold. In other words, the message module 405 can suppress a publishing of another road event message based on determining that the updated confidence metric oscillates between the upper threshold and the lower threshold of the hysteresis. If the updated confidence metric crosses back over the upper threshold, the message module 405 can publish a corresponding road event message. In one embodiment, suppressing refers to not publishing a new road event message even as new road event reports are collected from the vehicles 101 in real time.

In one embodiment, the publishing of the road event message is further based on a spatial constraint, a temporal constraint, or a combination thereof. By way of example, the spatial and temporal constraints are parameters used by the confidence module 403 to aggregate and process collected road reports. The spatial constraint defines over what geographic area (e.g., a road link, portion of a road link, multiple road links, a defined geographic area, political boundary, etc.) a set of road reports are to be considered as originating from a single geographic. The temporal constraint defines the time span (e.g., a time epoch of 15-30 minutes) over which the set of road reports are to be aggregated.

Figure 6A:
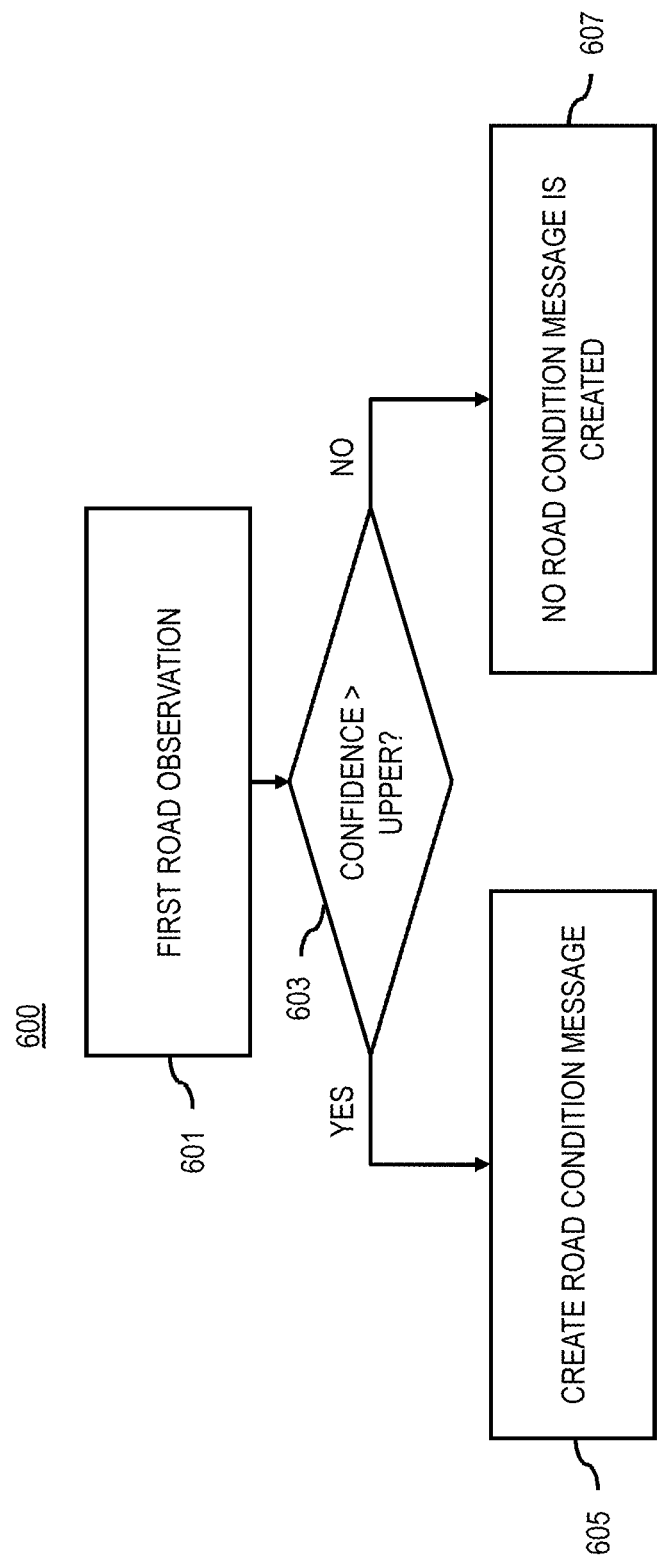
FIGS. 6A-6C are flowcharts of processes for creating, updating, and/or canceling a road event message, according to various embodiments.
Figure 6B:
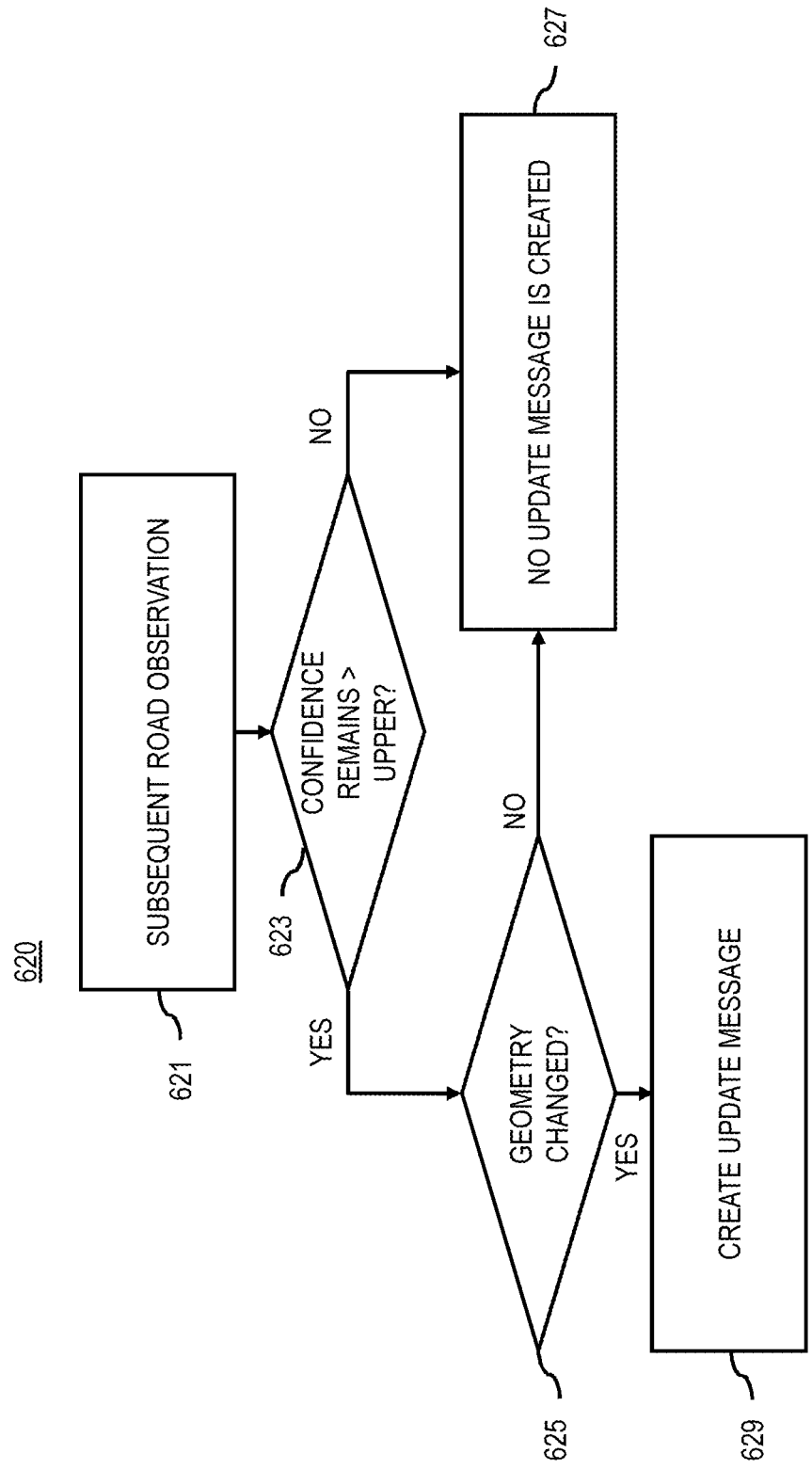
Figure 6C:
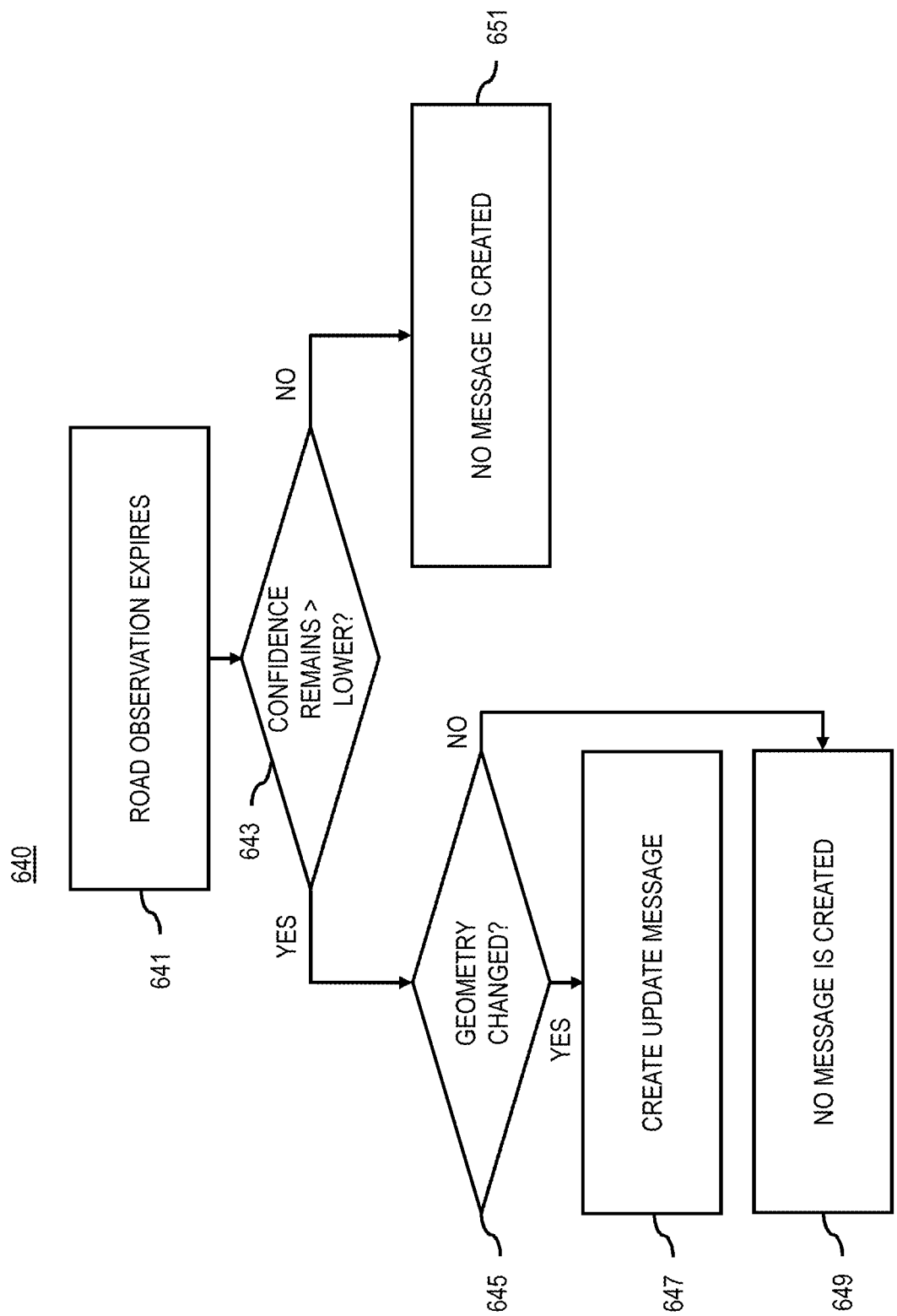

In one embodiment, the message module 405 can any use of the processes of FIGS. 6A-6C to process or manage the publishing, creating, updating, and/or canceling of road event messages. The examples of FIGS. 6A-6C are based on using the mapping platform 109 to collect and monitor road event reports (e.g., slippery road events) over a given road event topology comprising monitored road links, the vehicles 101 traveling over the monitored road links, and the road event reports or observations (e.g., slippery road observations) being generated by the vehicles 101. FIG. 6A illustrates a process for publishing road event messages meeting the upper confidence threshold of a hysteresis while suppressing other potentially duplicative road event messages, according to one embodiment. As shown in the process 600 of FIG. 6A, when a first road event observation (e.g., a slippery road event observation or report) is processed for an area of interest (step 601) to compare against a hysteresis (step 603). If the computed confidence crosses above the upper threshold of the hysteresis then the message module 405 a create message is produced and published to indicate that a road event (e.g., slippery road event) has been detected (step 605). If the computed confidence is below the upper threshold of the hysteresis, the message module 405 creates or publishes no road event message (step 607). In one embodiment, when a second road event observation is processed for an area such that the confidence calculated stays above the low threshold of the hysteresis, then no road event message is produced. In embodiments where suppression occurs based on both the lower and upper thresholds, no road event message is produced when the calculated confidence remains between the lower and upper thresholds of the hysteresis.

FIG. 6B is illustrates a process for publishing road event messages based on a geometry of the detected road event, according to one embodiment. As discussed above, the geometry of a road event includes the geographic extent of the road event, including the road links/segments, geographic areas, etc. covered by a detected road event. For example, based on the road event reports, the mapping platform 109 may determine that the same road event (e.g., slippery road event) may extend over multiple road links or segments of the road network. Over time, the geometry may change as additional road segments are affected by the road event or currently affected road segments no longer exhibit the road condition or event.

Accordingly, in one embodiment, as shown in process 620 of FIG. 6B, the message module 405 initiates a publishing of an update road event message based on determining that a geometry of the road event affecting the road link has changed (e.g., expanded or reduced in area, moved to a different road segment or area, etc.), and that the updated confidence metric is greater than the lower threshold of the hysteresis. For example, when a subsequent road event observation (e.g., observation or report following the publishing of a road event message about the road event) is processed (step 621) for an area such that the confidence calculated stays above the high threshold (step 623) and such that the geometry of the existing published road event message or warning does not change (625), then no update message about the road event is produced (step 627). However, when the subsequent observation is processed for an area such that the confidence calculated stays above the high threshold (step 623) and such that the geometry of the existing road event message or warning does change (step 625), then an update message is published (step 629). In one embodiment, the update message can indicate the change in geometry or other content (e.g., qualitative descriptors of the road event such as a severity, pictures/videos of the road event, audio of the road event, etc.) of the road event message or warning.

FIG. 6C illustrates a process for publishing road event messages that have limited time-to-live periods (e.g., have expiration times), according to one embodiment. For example, on an expiration of the road event message, the message module 405 initiates a publishing of an update road event message based on determining that a geometry of the road event affecting the road link has changed, and that the updated confidence metric is greater than the lower threshold of the hysteresis. In another embodiment, on an expiration of the road event message, the message module 405 initiates a publishing of a cancel or delete road event message based on determining that a geometry of the road event affecting the road link has changed and that the updated confidence metric is below the lower threshold of the hysteresis.

As shown process 640 of FIG. 6C, when a road event observation or report expires (step 641) such that the computed confidence stays above the lower threshold of the hysteresis (step 643) and such that the geometry of the existing published road event message or warning does not change (step 645), then no update message is produced (step 649).

In one embodiment, when a road event observation or report expires (step 641) such that the computed confidence stays above the low threshold of the hysteresis (step 643) and such that the geometry of the existing published road event message or warning does change (step 645), then an update message is produced (step 647). Otherwise, no update message is produced (step 649). The update message, for instance, is published to indicate the change in geometry or other content of the published road event message.

In one embodiment, when a road event observation expires (step 641) such that the confidence recalculated remains below the low threshold (step 643) no message is produced (step 651). This is because the confidence remaining below the low threshold implies that a delete or cancel message about the detected road event was already published.

In one embodiment, on publishing the road event report, the application interface 407 enables use of the published road event reports to support a variety of services, applications, functions, etc. supported by the end user devices or services (e.g., the vehicles 101, client terminal 115, services platform 111, services 113, etc.) to initiate one or more functions. For example, these functions can include, but are not limited to: (1) transmitting a signal to operate an autonomous vehicle or a semi-autonomous vehicle based on the road event message; and (2) presenting a user interface element depicting a visual representation of the road event in a mapping user interface of a device based on the road event message.

Figure 7:
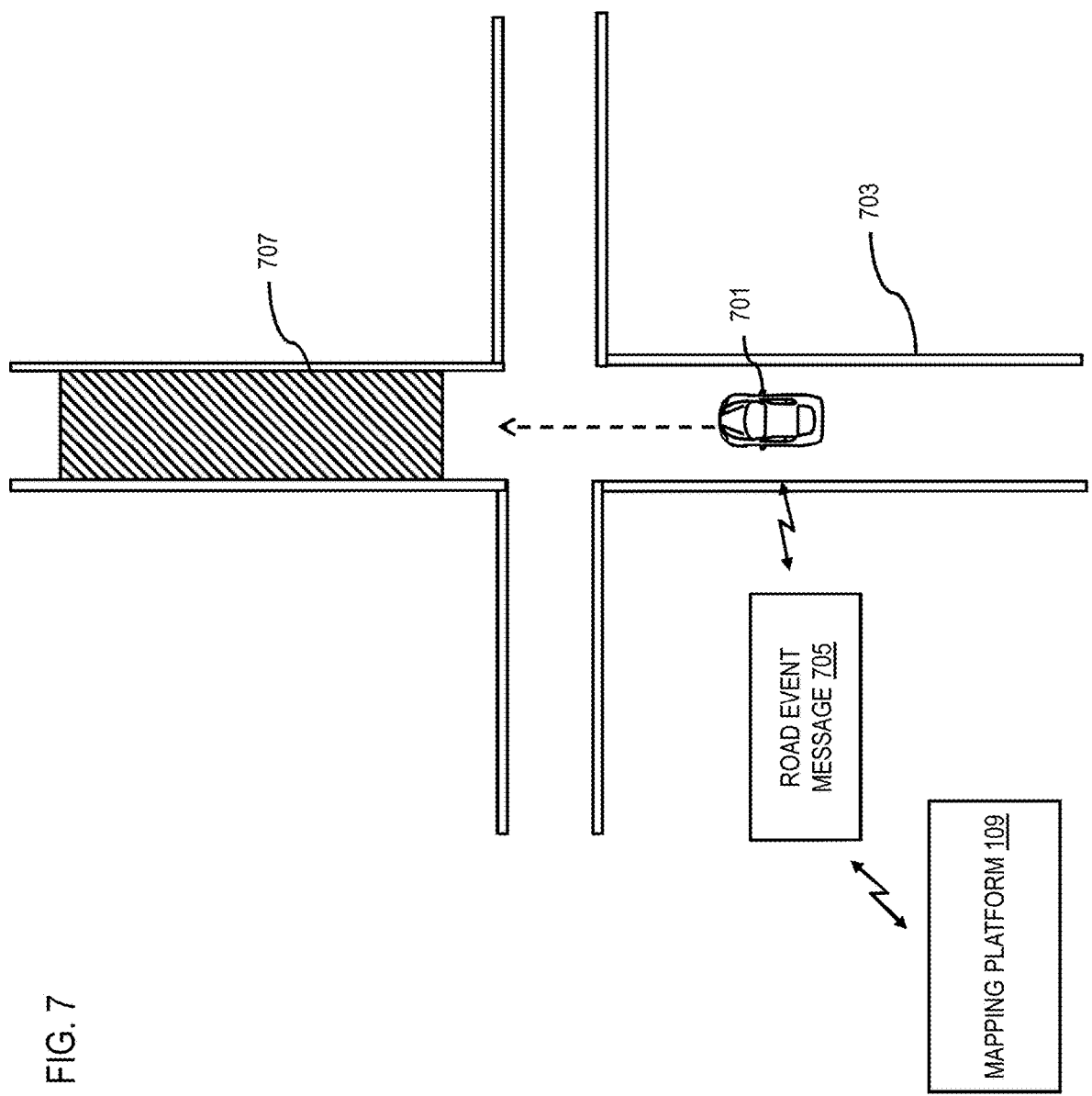
FIG. 7 is a diagram illustrating an example of using a published road event message to control an autonomous vehicle, according to one embodiment.

FIG. 7 is a diagram illustrating an example of using a published road event message to control an autonomous vehicle, according to one embodiment. In the example of FIG. 7, an autonomous or semi-autonomous vehicle 701 (for example, can be like a vehicle 101 or different) is traveling along a road 703. The vehicle 701 is capable of autonomous driving. The mapping platform 109 processes road reports collected from other vehicles traveling along the same road 703, and determines that there is a slippery road condition or event 707 with a computed confidence level that crosses the upper threshold of a hysteresis to trigger publishing of a road event message 705 to the vehicle 701.

On approaching the area of the road 703 for which the slippery road condition 707 is published in the road event message 705 is published, the vehicle 701 can automatically modify its autonomous driving operation to account for the road event 707 as long as the computed confidence of the road event 707 remains above a lower threshold of the hysteresis that would trigger the mapping platform 109 to publish another message to cancel the road event. For example, the vehicle 701 can slow down, take an alternate route, etc. as it travels through the road event 707 area. By applying the hysteresis to determine when to publish or cancel the road event message 705, the mapping platform 109 avoids unnecessary oscillation of sending messages to publish and then to cancel/update the road event message 705 when the computed confidence of the road event 707 oscillates around the upper publishing threshold. Similarly, when the computed confidence crosses below the lower threshold for cancellation, the mapping platform 109 also will not then publish a new road event message until the computed confidence crosses the upper threshold for publishing. This again avoids unnecessary publishing of road event messages when the computed confidence oscillates around the lower confidence threshold. In addition to reducing the number of transmitted message (and also the corresponding resource usage burden), the reduction in messages also can smooth the operation of the vehicle 701 by avoiding oscillations between initiating and then canceling vehicle operations and vice versa to in response to the message (e.g., slowing down and then speeding up as the vehicle 701, re-routing and then canceling the re-routing, etc. as the vehicle 701 approaches the road event 707 area).

Figure 8A:
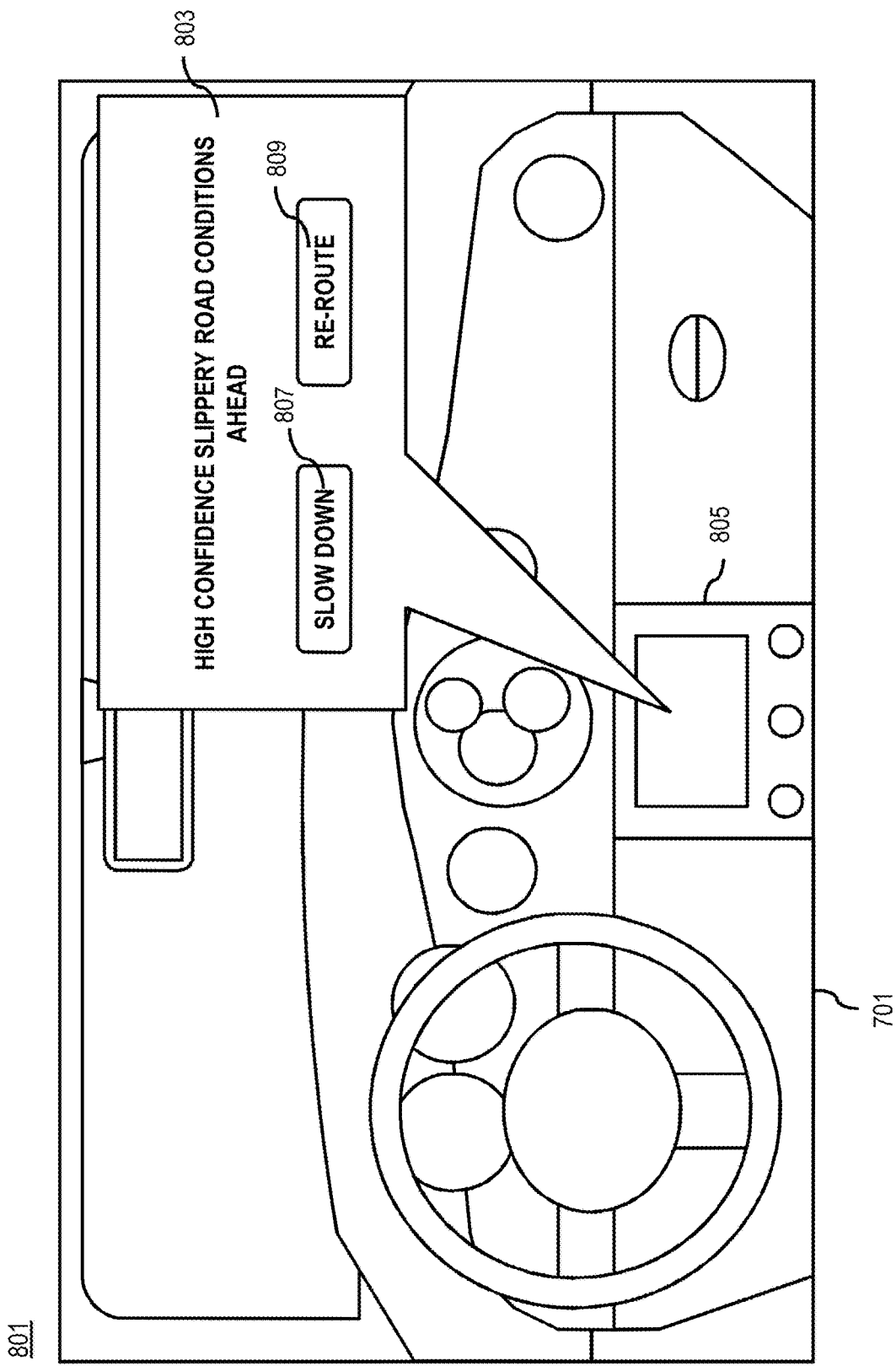
FIGS. 8A and 8B are diagrams illustrating of example user interfaces for presenting published road event message on a user device, according to various embodiments.
Figure 8B:
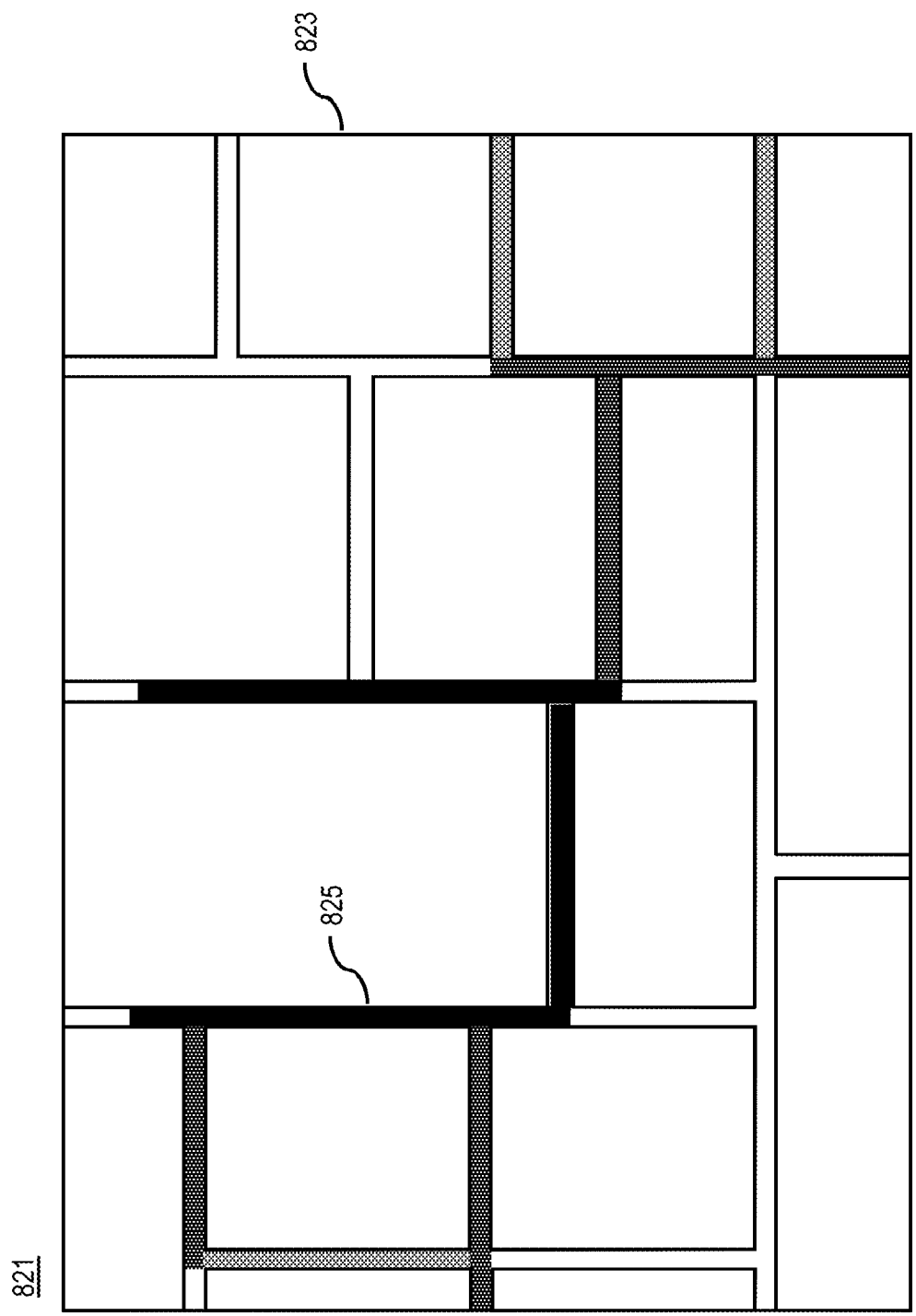

FIGS. 8A and 8B are diagrams illustrating of example user interfaces for presenting published road event message on a user device, according to various embodiments. It is noted that the example of FIG. 7 can be performed with or without presenting any accompanying user interface notification to a user or passenger of the vehicle 701. In other words, modifying autonomous vehicle functions based on hysteresis-based road event messages can occur in the background without informing a user. FIG. 8A illustrates an example use case 801 in which the user or passenger of the vehicle 701 is informed of the published road event message 705. In this example, as the vehicle 701 approaches the road event 707 area, a notification user interface element 803 can be presented on a navigation device 805 of the vehicle 701. The notification user interface element 803, for instance, presents an alert based on the published road event message 705 (e.g., "High confidence slippery road conditions ahead"). In one embodiment, the notification user interface element 803 can also present options to initiate actions in response to the published road event message 705. For example, these options can include, but are not limited to: (1) an option 807 to slow the vehicle 701 as it traverses the road event 707 area, and (2) an option 809 to re-route the vehicle to avoid the road event 707 area.

FIG. 8B illustrates an example mapping user interface 821 of a user device (e.g., a navigation system of a vehicle 101 or 701, client terminal 115, etc.) that presents the published road event messages (e.g., slippery road reports) as an overlay on graphical representations of a road network 823. In this example, depictions of road links or segments are highlighted based on the contents of slippery road event messages according to embodiments of the hysteresis-based approach described herein. For example, when the published road event message includes content indicating a severity level of the slippery road event, the user interface 821 can present different visual representations 825 (e.g., shading, color, highlights, etc.) of the corresponding road links to indicate the severity level. By using a hysteresis approach, the mapping platform 109 avoids unnecessarily updating the user interface 821 to render and then un-render the visual representations 825 of the highlights when computed confidences oscillate with respect to the upper and/or lower thresholds of the hysteresis.

Returning to FIG. 1, in one embodiment, the vehicles 101 include autonomous, semi-autonomous, or highly assisted driving vehicles that are capable of sensing their environment and navigating within a travel network without driver or occupant input using a variety of sensors 103. The sensors 103 also capable of sensing parameters or characteristics related to the roadway, environment, vehicle dynamics, etc. that can be used to detect or report road events (e.g., slippery road events). The vehicles 101 also have the capability to report detected incident/road events and/or related sensor data to the mapping platform 109 in real-time or near real-time for detection and publication of road events according to various embodiments described herein. In one embodiment, the vehicles 101 also have the capability to disable, enable, and/or otherwise modify autonomous driving functions in response to published road events. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

- Level 0 (No-Automation)—"The driver is in complete and sole control of the primary vehicle controls—brake, steering, throttle, and motive power—at all times.";
- Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";
- Level 2 (Combined Function Automation)—"This level involves automation of at least two primary control functions designed to work in unison to relieve the driver of control of those functions. An example of combined functions enabling a Level 2 system is adaptive cruise control in combination with lane centering.";
- Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and
- Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

In one embodiment, the various embodiments described herein are applicable to vehicles 101 or 701 that are classified in any of the levels of automation (levels 0-4) discussed above. By way of example, the sensors 103 may include any vehicle sensor known in the art including, but not limited to, a Lidar sensor, Radar sensor, infrared sensor, global positioning sensor for gathering location data (e.g., GPS), inertial measurement unit (IMU), network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data about a roadway, an audio recorder for gathering audio data, velocity sensors mounted on steering wheels of the vehicles, vehicle-to-vehicle communication devices or sensors, switch sensors for determining whether one or more vehicle switches are engaged, and the like.

Other examples of the sensors 103 may include light sensors, orientation sensors augmented with height sensors and acceleration sensor (e.g., an accelerometer can measure acceleration and can be used to determine orientation of the vehicle), tilt sensors to detect the degree of incline or decline (e.g., slope) of the vehicle along a path of travel, moisture sensors, pressure sensors, etc. In a further example embodiment, sensors about the perimeter of the vehicle 101 may detect the relative distance of the vehicle from a lane or roadway, the presence of other vehicles, pedestrians, traffic lights, potholes and any other objects, or a combination thereof. In one scenario, the sensors may detect slippery road events, weather data, traffic information, or a combination thereof. In yet another embodiment, the sensors can determine the status of various control elements of the car, such as activation of wipers, use of a brake pedal, use of an acceleration pedal, angle of the steering wheel, activation of hazard lights, activation of head lights, etc. In one embodiment, the sensor data can be collected by and/or retrieved from an on-board diagnostic (OBD) or other vehicle telemetry system of the vehicle 101 through an interface or port (e.g., an OBD II interface or equivalent). Any combination of these sensors can be used to detect and report road events such as slippery road events.

In one embodiment, the road event reports can be supplemented with additional information from network-based services such as those provided by a services platform 111 and services 113 for publishing road events according to a hysteresis according to the various embodiments described herein. By way of example, the services 113 can include weather services, mapping services, navigation services, and/or other data services that provide data for sensing and/or reporting road events such as slippery road events based on road-vehicle friction change associated with a road segment or area of interest. In one embodiment, the services platform 111 and/or the services 113 interact with content providers 125a-125k (also collectively referred to as content providers 125) that provide content data (e.g., weather data, incident reports, vehicle sensor data, mapping data, imaging data, etc.) to the mapping platform 109, services platform 111, and/or the services 113.

By way of example, the client terminal 115 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a client terminal 115 can support any type of interface to the user (such as "wearable" circuitry, etc.). In addition, the terminal 115 may facilitate various input means for receiving and generating information, including, but not restricted to, a touch screen capability, a keyboard and keypad data entry, a voice-based input mechanism, and the like. Any known and future implementations of the client terminal 115 may also be applicable. In one embodiment, the client terminal 115 can be an embedded component of the vehicle 101 to provide communications capabilities, navigation services, road event sensing and reporting, and/or other related services (e.g., by executing an application 123).

In one embodiment, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the mapping platform 109 can interact with the services platform 111 to receive data for publishing road events according to a hysteresis. By way of example, the services platform 111 may include one or more services 113 for providing weather data (e.g., the weather database 121) used by the system 100 according to various embodiment described herein. The services platform 111 and/or the services 113 can also provide related services such as provisioning services, application services, storage services, mapping services, navigation services, contextual information determination services, location-based services, information-based services (e.g., weather), etc. In one embodiment, the services platform 111 may include or be associated with the road event database 117, the geographic database 119, and/or the weather database 121.

By way of example, the vehicle 101, mapping platform 109, the services platform 111, and client terminal 115 communicate with each other and other components of the system 100 over the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
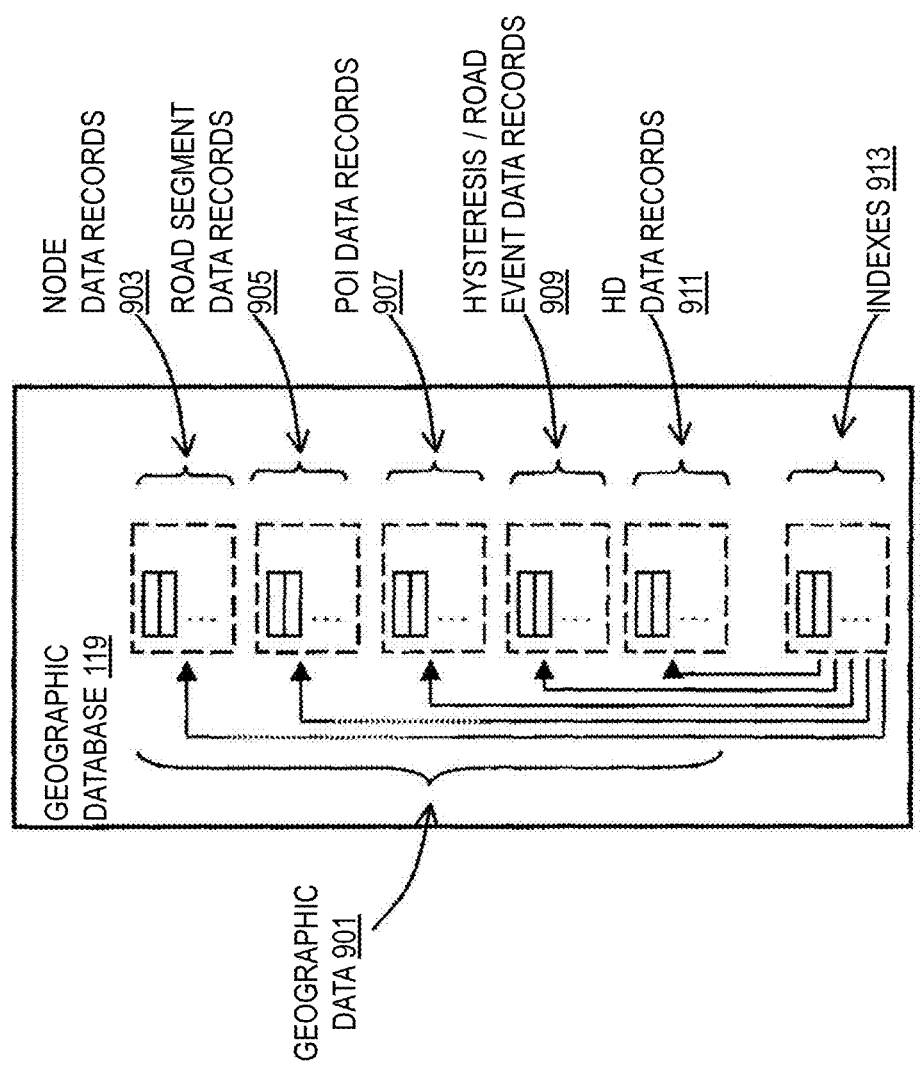
FIG. 9 is a diagram of a geographic database, according to one embodiment.

FIG. 9 is a diagram of a geographic database 119, according to one embodiment. In one embodiment, the geographic database 119 includes geographic data 901 used for (or configured to be compiled to be used for) mapping and/or navigation-related services, such map matching against reported road events and for storing data records associating road event messages (e.g., slippery event messages), hysteresis thresholds, and/or related data to geographic features such as road segments or map tiles represented in the geographic database 119. In one embodiment, the geographic database 119 include high definition (HD) mapping data that provide centimeter-level or better accuracy of map features. For example, the geographic database 119 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 119.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 119 follows certain conventions. For example, links do not cross themselves and do not cross each other except at a node. Also, there are no duplicated shape points, nodes, or links. Two links that connect each other have a common node. In the geographic database 119, overlapping geographic features are represented by overlapping polygons. When polygons overlap, the boundary of one polygon crosses the boundary of the other polygon. In the geographic database 119, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 119 includes node data records 903, road segment or link data records 905, POI data records 907, hysteresis/road event data records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 119. In one embodiment, the indexes 913 may be used to quickly locate data without having to search every row in the geographic database 119 every time it is accessed.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles 101, cars, and/or other entities. Alternatively, the geographic database 119 can contain path segment and node data records or other data that represent pedestrian paths or areas in addition to or instead of the vehicle road record data, for example. In one embodiment, road event data records 909 can be associated with any of the node data records 903 and/or road segment data 905 to indicate that a road event (e.g., a slippery road event) has been detected or reported at a confidence level meeting a configurable threshold for a road segment or area of interest corresponding to the associated node data records 903 and/or road segment records 905.

In addition to road events, the road/link segments and nodes can be associated with attributes, such as geographic coordinates, street names, address ranges, speed limits, turn restrictions at intersections, and other navigation related attributes, as well as points of interests ("POIs"), such as gasoline stations, hotels, restaurants, museums, stadiums, offices, automobile dealerships, auto repair shops, buildings, stores, parks, etc. The geographic database 119 can include data about the POIs and their respective locations in the POI data records 907. The geographic database 119 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 119 can include hysteresis/road event data records 909 containing road event reports, their corresponding computed confidence levels, hysteresis threshold values (e.g., upper confidence threshold for publishing a road event, and lower threshold for canceling the published event), and/or other related data used in the various embodiments described above. In one embodiment, the geographic database 119 can provide the hysteresis in response to a location based search from the mapping platform 109. In this way, the mapping platform 109 can obtain the hysteresis threshold values for the road links or geographic area being monitored for published road event messages. In one embodiment, the hysteresis/road event data records 909 may be associated as attributes of any of the records 903-907 and 911 of the geographic database 119. In this way, for instance, the road event data records 909 may then be accessed and/or presented via user interfaces of end user devices (e.g., vehicle 101, client terminal 115, etc.) as part of a local hazard warning system or other mapping data pipeline. The hysteresis thresholds can also be calculated with respect to any of the characteristics stored in the database 119 about the road links, nodes, etc. (e.g., functional class, location, speed limit, etc.). In addition or alternatively, the road event data records 909 may be stored in the road event database 117.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources). In one embodiment, the road event data records 909 (e.g., including the calculated confidence levels of reported road events) can be associated with the HD mapping data records 911 so that road events and their confidence levels can be localized to the centimeter-level of accuracy of the HD mapping data records 911.

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time road event data, traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like. In one embodiment, these sensor data can be used to report road events and their associated confidence levels determined according to the various embodiments described herein.

In one embodiment, the geographic database 119 can be maintained by the content provider 125 in association with the services platform 111 (e.g., a map developer). The map developer can collect geographic data to generate and enhance the geographic database 119. There can be different ways used by the map developer to collect data. These ways can include obtaining data from other sources, such as municipalities or respective geographic authorities. In addition, the map developer can employ field personnel to travel by vehicle (e.g., vehicle 101 and/or client terminal 115) along roads throughout the geographic region to observe features and/or record information about them, for example. Also, remote sensing, such as aerial or satellite photography, can be used.

The geographic database 119 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

In one embodiment, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or client terminal 115, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 119 can be a master geographic database, but in alternate embodiments, the geographic database 1119 can represent a compiled navigation database that can be used in or with end user devices (e.g., vehicle 101, client terminal 115, etc.) to provide navigation-related functions. For example, the geographic database 119 can be used with the end user device to provide an end user with navigation features including road event alerts. In such a case, the geographic database 119 can be downloaded or stored on the end user device (e.g., vehicle 101, client terminal 115, etc.) or the end user device can access the geographic database 119 through a wireless or wired connection (such as via a server and/or the communication network 107), for example. Furthermore, the geographic database 119 or compiled features thereof can be provided as a cloud service.

In one embodiment, the geographic database 119 is presented according to a hierarchical or multi-level tile projection. More specifically, in one embodiment, the geographic database 119 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached. As previously described, the road event data records 909 can be associated with any of the map tiles to indicate that a road event has been detected in the geographic area represented by the map tile.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

In one embodiment, the geographic database 119 may identify a tile by a quadkey determined based on the tile ID of a tile of the map tile grid. The quadkey, for example, is a one dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one dimensional array of the quadkey. In another example, the length of the one dimensional array of the quadkey may indicate the corresponding level within the map tile grid. In one embodiment, the quadkey is an example of the hash or encoding scheme of the respective geographical coordinates of a geographical data point that can be used to identify a tile in which the geographical data point is located.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., client terminal 115) can be a cellular or mobile telephone. An end user can use the device navigation functions such as guidance and map display, for example, and for determination of route information to at least one identified point of interest, according to exemplary embodiments.

The processes described herein for providing publishing road event messages according to a hysteresis using mapping data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
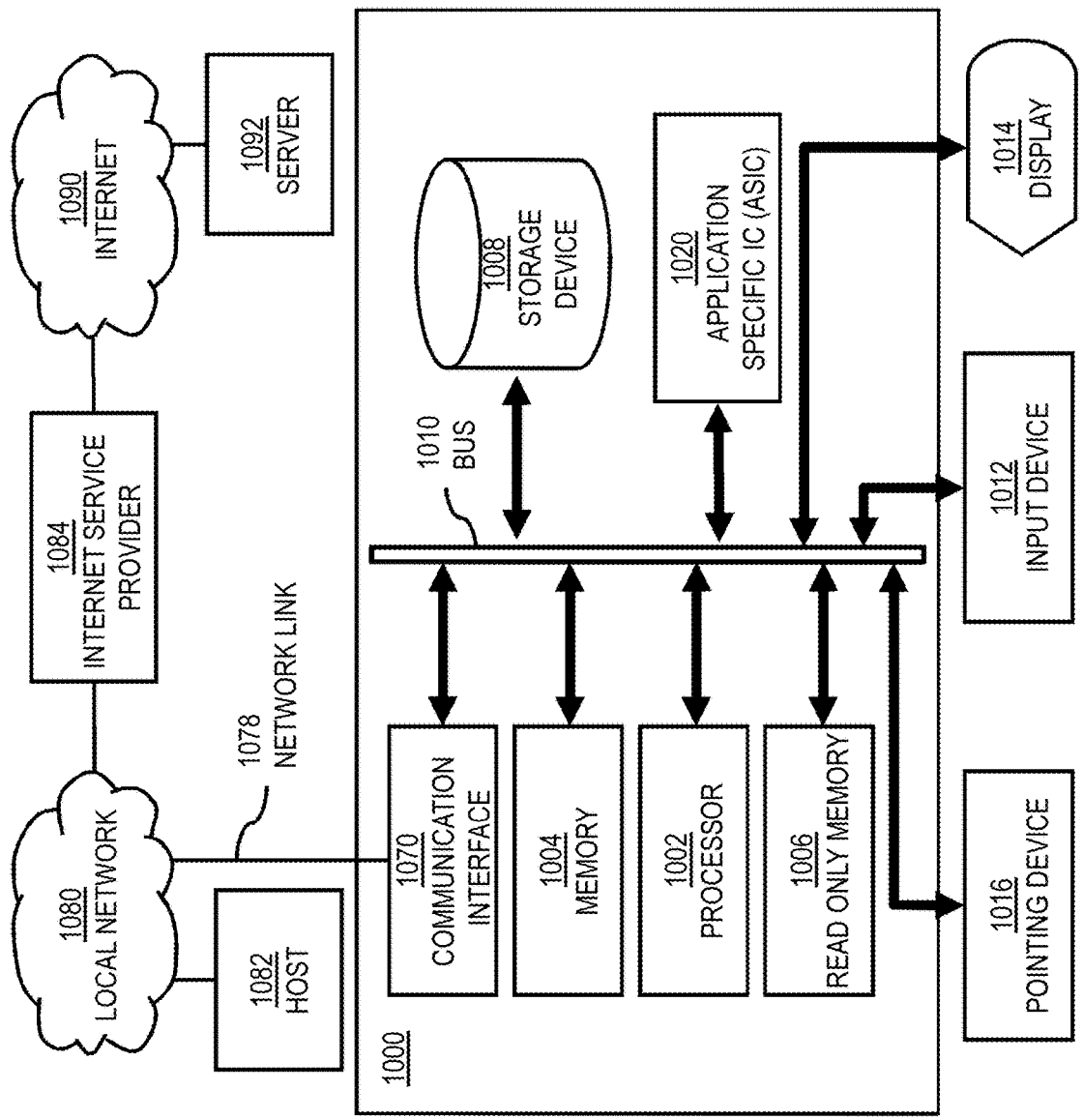
FIG. 10 is a diagram of hardware that can be used to implement the system and/or functions thereof, according to one embodiment.

FIG. 10 illustrates a computer system 1000 upon which an embodiment of the invention may be implemented. Computer system 1000 is programmed (e.g., via computer program code or instructions) to publish road event messages according to a hysteresis using mapping data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to publishing road event messages according to a hysteresis using mapping data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for publishing road event messages according to a hysteresis using mapping data. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for publishing road event messages according to a hysteresis using mapping data, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for publishing road event messages according to a hysteresis using mapping data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to publish road event messages according to a hysteresis using mapping data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purpose processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to publish road event messages according to a hysteresis using mapping data. The memory 1105 also stores the data associated with or generated by the execution of the inventive steps.

Figure 12:
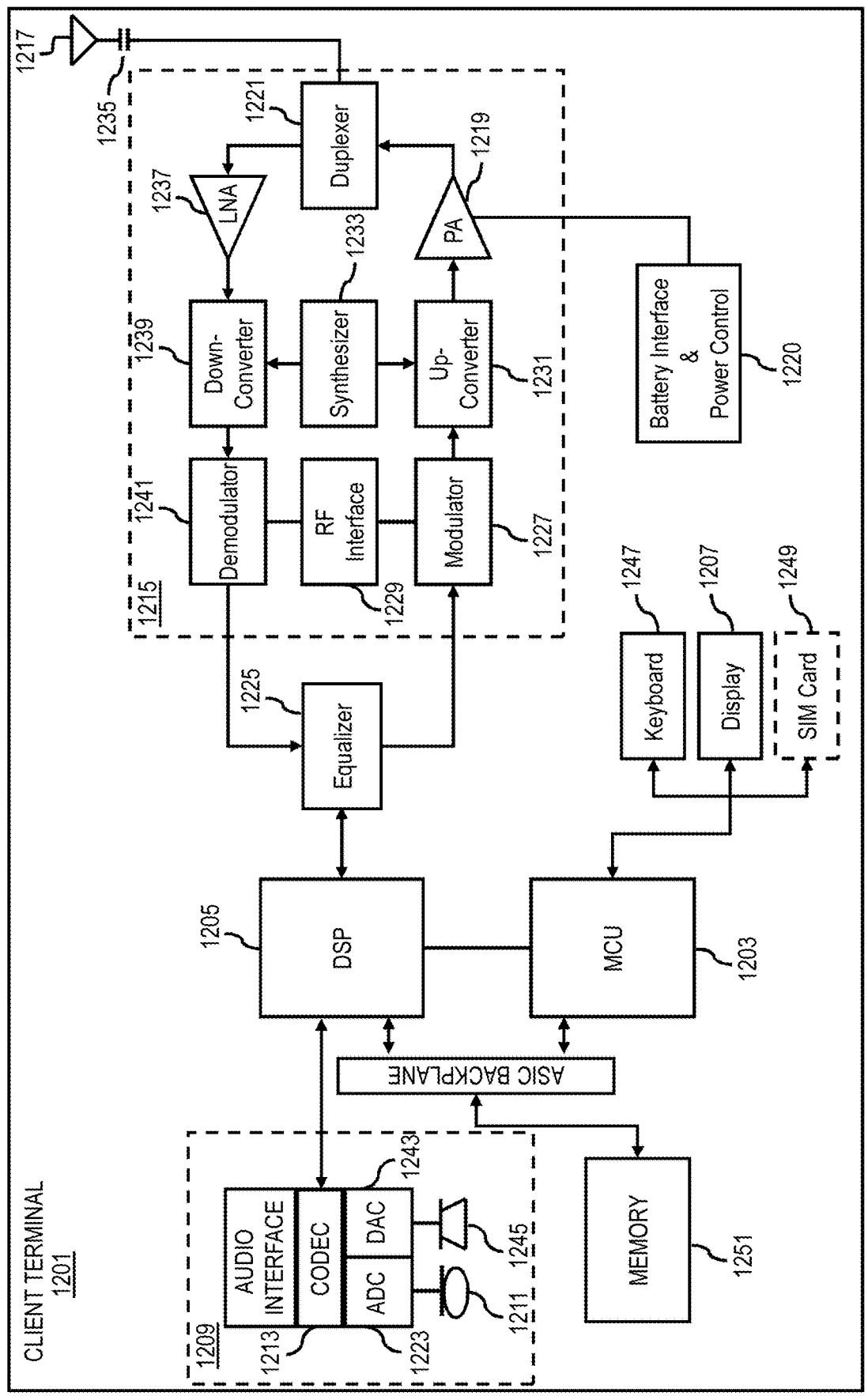
FIG. 12 is a diagram of a mobile terminal (e.g., handset or vehicle or part thereof) that can be used to implement an embodiment.

FIG. 12 is a diagram of exemplary components of a client terminal 1201 (like device 115 or vehicle 101 or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to publish road event messages according to a hysteresis using mapping data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for publishing a road event message comprising:
   processing a road report to determine a road event associated with a geographic location and a confidence metric of the road event;
   initiating, by a processor, a publishing of a road event message to indicate the road event for the geographic location based on determining that the confidence metric is greater than an upper threshold of a hysteresis that is lower than one;
   processing one or more other road reports to update the confidence metric of the road event; and
   initiating a cancelling of the road event message based on determining that the updated confidence metric is less than a lower threshold of the hysteresis that is higher than zero, wherein the upper threshold of the hysteresis is lower than 0.6, and the lower threshold of the hysteresis is higher than 0.4.

2. The method of claim 1, further comprising:
   suppressing a publishing of another road event message based on determining that the updated confidence metric remains between the lower threshold and the upper threshold of the hysteresis.

3. The method of claim 1, further comprising:
   initiating a publishing of an updated road event message based on determining that a geometry of the road event affecting the geographic location has changed, and that the updated confidence metric is greater than the lower threshold of the hysteresis.

4. The method of claim 1, further comprising:
   on an expiration of the road event message, initiating a publishing of an updated road event message based on determining that a geometry of the road event affecting the geographic location has changed, and that the updated confidence metric is greater than the lower threshold of the hysteresis.

5. The method of claim 1, further comprising:
   on an expiration of the road event message, initiating a publishing of a deleted road event message based on determining that a geometry of the road event affecting the geographic location has changed and that the updated confidence metric is below the lower threshold of the hysteresis.

6. The method of claim 1, wherein the road event is a slippery road event.

7. The method of claim 1, wherein the confidence metric is based, at least in part, on a number of vehicles reporting the road event, a correlation of the road event to weather data, and a data freshness threshold for reports of the road event by the vehicles.

8. The method of claim 1, wherein the road event is a visibility road event.

9. The method of claim 1, wherein the road report is generated based on sensor data retrieved from an on-board diagnostic, a vehicle telemetry system, or a combination thereof.

10. The method of claim 7, further comprising:
    determining a map tile level of a multi-level map tile-based system for retrieving the weather data based on a weather parameter, an accuracy level, or a combination thereof; and
    retrieving the weather data based on the map tile level, wherein the publishing of the road event message is further based on a spatial constraint, a temporal constraint, or a combination thereof.

11. The method of claim 9, wherein the hysteresis is based on one or more characteristics of the geographic location and the road event, and
    wherein the weather parameter is an air temperature parameter or a precipitation intensity parameter.

12. An apparatus for publishing a road event message comprising:
    at least one processor; and
    at least one memory including computer program code for one or more programs,
    the at least one memory and the computer program code configured to, with the at least one processor, cause the apparatus to perform at least the following,
      monitor a confidence metric for a road event detected on a geographic location;
      publish a road event message indicating the road event when the confidence metric is greater than an upper threshold of a hysteresis that is lower than one; and
      cancel the road event message when the confidence metric is less than a lower threshold of the hysteresis that is higher than zero,
    wherein the upper threshold of the hysteresis is lower than 0.6, and the lower threshold of the hysteresis is higher than 0.4.

13. The apparatus of claim 12, wherein the confidence metric is computed based on one or more road reports received from a vehicle, a sensor, a device, or a combination thereof operating on the geographic location.

14. The apparatus of claim 12, wherein the apparatus is further caused to:
    transmit a signal to operate an autonomous vehicle or a semi-autonomous vehicle based on the road event message.

15. The apparatus of claim 12, wherein the apparatus is further caused to:
    present a user interface element depicting a visual representation of the road event in a mapping user interface of a device based on the road event message.

16. The apparatus of claim 12, wherein the road event is a slippery road event.

17. A non-transitory computer-readable storage medium for publishing a road event message, carrying one or more sequences of one or more instructions which, when executed by one or more processors, cause an apparatus to perform:
    querying a geographic database for a hysteresis associated with a geographic location;
    publishing a road event message to indicate a road event detected on the geographic location when a confidence metric of the road event is greater than an upper threshold of the hysteresis that is lower than one; and
    cancelling the road event message when the confidence metric of the road event is less than a lower threshold of the hysteresis that is higher than zero, wherein the upper threshold of the hysteresis is lower than 0.6, and the lower threshold of the hysteresis is higher than 0.4.

18. The non-transitory computer-readable storage medium of claim 17, wherein the apparatus is further caused to perform:
computing the upper threshold, the lower threshold, or a combination thereof of the hysteresis based on one or more characteristics of the geographic location stored in the geographic database.

19. The non-transitory computer-readable storage medium of claim 17, wherein the road event message is published through a third-party server or directly to one or more vehicles.

* * * * *